United States Patent
Blunt et al.

(10) Patent No.: US 8,433,388 B2
(45) Date of Patent: Apr. 30, 2013

(54) SOURCE AFFINE RECONSTRUCTION FOR MEDICAL IMAGING

(75) Inventors: Shannon D. Blunt, Shawnee, KS (US); Mihai Popescu, Overland Park, KS (US); Tsz Ping Chan, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 1140 days.

(21) Appl. No.: 12/335,434

(22) Filed: Dec. 15, 2008

(65) Prior Publication Data

US 2009/0182220 A1    Jul. 16, 2009

Related U.S. Application Data

(60) Provisional application No. 61/013,544, filed on Dec. 13, 2007.

(51) Int. Cl.
*A61B 5/05* (2006.01)
(52) U.S. Cl.
USPC ............ 600/407; 600/409; 600/410; 600/425
(58) Field of Classification Search .................. 600/407, 600/409, 410, 425
See application file for complete search history.

(56) References Cited

U.S. PATENT DOCUMENTS

| | | | |
|---|---|---|---|
| 7,974,671 B2 * | 7/2011 | Fujiwara et al. | 600/344 |
| 2005/0154290 A1 | 7/2005 | Langleben | |
| 2007/0191704 A1 | 8/2007 | DeCharms | |
| 2007/0276225 A1 | 11/2007 | Kaufman et al. | |
| 2007/0276279 A1 | 11/2007 | Echauz et al. | |

OTHER PUBLICATIONS

Blunt, Shannon D. et al., *Adaptive Pulse Compression via MMSE Estimation*, University of Kansas, IEEE Transactions on Aerospace and Electronic Systems, vol. 42, No. 2, Apr. 2006, pp. 87-99.
Dalal, Sarang S. et al., *Modified Beamformers for Coherent Source Region Suppression*, IEEE Transactions on Biomedical Engineering, vol. 53, No. 7, Jul. 2006, pp. 100-106.
Moran, J.E. et al., *Multi-Resolution FOCUSS: A Source Imaging Technique Applied to MEG Data*, Brain Topography, vol. 18, No. 1, Fall 2005, pp. 53-69.
Mosher, John C. et al., *Multiple Dipole Modeling and Localization from Spatio-Temporal MEG Data*, IEEE Transactions on Biomedical Engineering, vol. 39, No. 6, Jun. 1992, pp. 70-86.
Popescu, Mihai et al., *Spatio-Temporal Reconstruction of Bilateral Auditory Steady-State Responses using MEG Beamformers*, (Revised May 21, 2007), Document TBME-00127-2007.R1, pp. 28-38.
Van Veen, Barry D. et al., *Localization of Brain Electrical Activity via Linearly Constrained Minimum Variance Spatial Filtering*, IEEE Transactions on Biomedical Engineering, vol. 44, No. 9, Sep. 1997, pp. 39-52.

* cited by examiner

*Primary Examiner* — Peter Luong
(74) *Attorney, Agent, or Firm* — Workman Nydegger

(57) ABSTRACT

Performing medical imaging. The generation of medical images, which includes a Source AFFine Image REconstruction (SAFFIRE) algorithm, is based on an iterative implementation of minimum mean-square error (MMSE) estimation within an affine-transformed solution space and utilizes a matched filter bank initialization coupled with energy normalization of each successive estimate. An incoherent integration technique provides an alternative implementation strategy to either increase signal-to-noise ratio (SNR) or generalize the estimator to accommodate temporally-separated interference sources. In addition, the estimator solution may be employed to determine volumetric constraints with which to re-apply the estimator to further improve the estimation accuracy.

20 Claims, 19 Drawing Sheets

SOURCE AFFINE RECONSTRUCTION FOR MEDICAL IMAGING

CROSS-REFERENCE TO RELATED APPLICATIONS

This application claims the benefit of U.S. Provisional Patent Application Ser. No. 61/013,544, filed Dec. 13, 2007, entitled "Source Affine Reconstruction for Medical Imaging," which application is incorporated herein by reference.

BACKGROUND OF THE INVENTION

1. The Field of the Invention

The present invention relates to medical imaging. More specifically, embodiments of the present invention relates to systems and methods for using an image reconstruction algorithm to perform medical imaging.

2. The Relevant Technology

Electroencephalography (EEG) and magnetoencephalography (MEG) are examples of medical imaging techniques currently used in clinical and research settings. Specifically, EEG and MEG are used to measure the electrical and magnetic fields generated directly by the electrical activity of the brain. EEGs and MEGs are typically used in functional brain imaging by performing a non-invasive procedure wherein the patient's neural activity is detected using an array of sensors placed on the outside of the patient's head. Once the patient's neural activity is captured, signal processing techniques are used to determine the location of the patient's underlying neural sources.

The use of MEG/EEG measurements to obtain precise spatial localization of brain activity regions has been a topic of intense research for the last two decades with numerous different signal processing techniques being developed. Most procedures addressing the inverse EEG and MEG problems can be categorized as either multiple dipole or distributed source (or imaging) methods.

The multiple dipole approaches assume the regional brain activation to be relatively focal, so that it can be well accounted for by a small number of current dipoles. This category of techniques rely on dipole fitting algorithms, such as the ones available in the Brain Electrical Source Analysis "BESA" software distributed by MEGIS Software GmbH. The multiple dipole approaches typically use non-linear optimization procedures, such as gradient steepest descent or downhill simplex algorithms, to search for the dipole parameters (including location, orientation and strength) that best explain the measured data in a deterministic least squares sense. Unfortunately, however, there are well-documented drawbacks of the multiple dipole methods, such as their high sensitivity to user-established initial conditions, including the number of dipoles and their initial parameters. Because of the high non-convexity of the error surface with respect to the dipole locations, the optimization algorithms may erroneously converge to local minima, particularly when there are a large number of unknown parameters. Another algorithm referred to as the multiple signal classification or "MUSIC" algorithm, makes use of signal subspace techniques in order to overcome some of the drawbacks of the multiple dipole approaches, but still may perform poorly when sources are distributed or highly correlated.

Alternatively, distributed source models have also been used to estimate the sources of brain activity. These models have also been intensely scrutinized, particularly because they overcome some of the limitations of the multiple dipole models, including those mentioned above. In the distributed source model approaches, the brain or restricted cortical mantle is considered as a source space comprised of a lattice of points, which include the locations of a large number of dipoles. The main advantage of the distributed source models is that the sources parameters may be estimated from the measured data without requiring a priori information about the number or location of the active sources. Thus, the distributed source models are less sensitive to a set of initial conditions as the multiple dipole approaches. Unfortunately, however, because the estimation is an ill-posed image reconstruction problem, even the distributed source models still require a priori constraints, although the a priori constraints for the distributed source models are different than the constraints of the multiple dipole strategy.

In various distributed source model implementations currently known in the art, such as the CURRY and SOURCE 5 source reconstruction software distributed by Compumedics Neuroscan, a minimum-norm estimate or "MNE" approach seeks a distribution of dipoles that matches the measured data and has a minimum power. While this approach is suitable for smooth, extended active brain regions, its estimates can be systematically biased towards the outer brain surface and are always smeared due to the approach's tendency to overestimate the spatial extension of the source pattern. Hence, the approach often provides source estimates with a spatial distribution that is much more extended than the expected focal brain activity in real brain measurements.

One possible solution to overcome the bias and smearing problems of the MNE approach has been proposed, wherein an iteratively re-weighted minimum norm method, such as the FOCal Underdetermined System Solution or "FOCUSS" approach is used. In the FOCUSS method, iterative approach based on a regularized Least Squares formulation is used with an initial solution obtained via a Moore-Penrose pseudoinverse. More specifically, the initial pseudoinverse solution is then employed to weight the Least Squares estimate of the updated solution. One drawback of this approach, however, is that there is a strong bias towards solutions that identify activity close to the outer surface of the brain, due to the inherited bias of the initialization step. The reason for such bias is that the attenuation of a given MEG signal is a function of the physical depth of the generator location or the relative distance to the sensors. Although some adjustments have been proposed to remove the biasing of the FOCUSS algorithm, including attempts to adjust the initialization and/or iterative steps of the algorithm, the adjustments appear ad hoc and the successful removal of biasing has not yet been achieved.

A final class of imaging techniques recently proposed for MEG purposes use beamforming principles and are sometimes called covariance-based techniques since they require good estimates of the spatio-temporal data covariance matrix. Examples of this approach include the linearly-constrained minimum variance beamformer or "LCMV" approach and the Synthetic Aperture Magmetometry or "SAM" approach. Neither the LCMV or SAM solution requires prior knowledge of the source location and activity, including the dipole orientations and/or magnitudes, for the reconstruction process. One problem with both methods, however, is that both LCMV and SAM assume there is no temporal correlation between the activities of neural sources at different locations in the brain. When such temporal correlation is present, this type of beamforming may result in erroneous signal cancellation.

Recently, modifications to the LCMV technique have been proposed and evaluated for auditory steady state responses, although the proposed technique requires prior knowledge of interferer locations which are generally unknown in experimental data. Another drawback of this type of beamforming is the relatively large number of time samples required to effectively construct a good estimator of the data covariance matrix. Additionally, the spatial resolution is fundamentally limited by the number of sensors in the array.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE INVENTION

Embodiments of the invention relate to new methods and system for performing medical imaging. The systems and methods include a Source AFFine Image REconstruction or "SAFFIRE" algorithm, which does not suffer from the spatial and temporal limitations of conventional imaging systems.

One aspect of the invention is a method of performing medical imaging. The method comprises capturing a data signal by monitoring the electric activity occurring in a sampled area of a patient in response to stimuli, transferring the captured signal to a processing unit which is capable of performing a series of functions on the captured signal, and displaying the estimate of the location of the electric activity in the sample area in a display. The series of functions performed by the processing unit may include creating a data vector for each time sample of the captured signal, creating a noise covariance matrix estimate from a plurality of time samples, the noise covariance matrix comprising only noise and ambient, non-induced signals, creating an affine-transformed matched filter bank estimate, computing the received signal energy at a given time sample, energy normalizing the matched filter estimate, and performing a series of iterations comprising applying a minimum mean-square error filter bank and an energy normalization process to the matched filter estimate in order to generate a new estimate which indicates the location of the electric activity in the sampled area.

A second aspect of the invention is a system capable of performing medical imaging. The system may include a plurality of sensing devices capable of capturing a data signal corresponding to the electric activity occurring in a sampled area of a patient in response to stimuli, a processing unit which is capable of performing a series of functions on the captured signal, a plurality of leads capable of transmitting the captured signal from the plurality of sensing devices to the processing unit, and a display capable of displaying the estimate of the location of the electric activity in the sample area. The series of functions performed by the processing unit may comprise creating a data vector for each time sample of the captured signal, creating a noise covariance matrix estimate from a plurality of time samples, the noise covariance matrix comprising only noise and ambient, non-induced signals, creating an affine-transformed matched filter bank estimate, computing the received signal energy at a given time sample, energy normalizing the matched filter estimate, and performing a series of iterations comprising applying a minimum mean-square error filter bank and an energy normalization process in order to generate a new estimate which indicates the location of the electric activity in the sampled area.

Another aspect of the invention is a method of performing medical imaging which uses a regularized psuedo-inverse estimate. The method comprises capturing a data signal by monitoring the electric activity occurring in a sampled area of a patient in response to stimuli, transferring the captured signal to a processing unit which is capable of performing a series of functions on the captured signal, and displaying the estimate of the location of the electric activity in the sample area in a display. The series of functions performed by the processing unit comprise creating a data vector for each time sample of the captured signal, creating a noise covariance matrix estimate from a plurality of time samples, the noise covariance matrix comprising only noise and ambient, non-induced signals, computing the received signal energy at a given time sample, creating a regularized psuedo-inverse estimate of the received signal energy computed at a given time sample, energy normalizing the regularized pseudo-inverse estimate, and performing a series of iterations comprising applying a minimum mean-square error filter bank and an energy normalization process to the estimate in order to generate a new estimate which indicates the location of the electric activity in the sampled area.

As described more fully below, advantages of using the system and methods described herein include the ability to more accurately image the electromagnetic activity in a patient.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to a new medical imaging technique, which includes a Source AFFine Image REconstruction or "SAFFIRE" algorithm, which does not suffer from the spatial and temporal limitations when generating an image.

Embodiments of the invention provide a method which achieves unprecedented accuracy in magnetoencephalography (MEG) and electroencephalography (EEG) medical imaging. Embodiments of the invention may be based on an iterative implementation of minimum mean-square error (MMSE) estimation within an affine-transformed solution space. The invention utilizes a matched filter bank initialization coupled with energy normalization at each successive estimate. An incoherent integration technique provides an alternative implementation strategy to either increase signal-to-noise ratio (SNR) or to generalize the estimator in order to accommodate temporally-separated interference sources. In addition, the estimator solution may be employed to determine volumetric constraints with to which the estimator may be reapplied in order to further improve the estimation accuracy.

One benefit of the system and method described herein is that the algorithm provides a solution that does not require an ambitious initial estimate, which is capable of providing a more accurate and robust solution than the methods currently known in the art. As described more fully below, the method has been applied to simulated brain MEG auditory response data and has demonstrated the capability to precisely isolate the primary and secondary auditory responses, a challenging problem in the MEG imaging community. Thus, the system and method described herein have been shown to have advantages over the systems and methods currently known in the art.

As described more fully below, the SAFFIRE algorithm described herein is distinct from the FOCUSS algorithm, including differences that arise because each is derived from a different problem formulation (MMSE instead of Least-Squares in one embodiment) and because SAFFIRE employs a considerably less ambitious initial estimate. Because the mathematical structure of the MEG/EEG imaging problem is ill-posed, these differences between the algorithms enable SAFFIRE to achieve considerably greater accuracy and robustness, thus largely avoiding the biasing problem that currently exists in the FOCUSS algorithm.

Although the present invention may be used in association with any multi-channel imaging system, the present invention will be described in an embodiment which utilizes functional brain imaging methods, including EEG and MEG systems currently known in the medical imaging art. This embodiment is meant to be illustrative only, and one of ordinary skill in the art would recognize that the invention may be used in other multi-channel imaging systems without departing from the scope or spirit of the invention.

Figure 1:
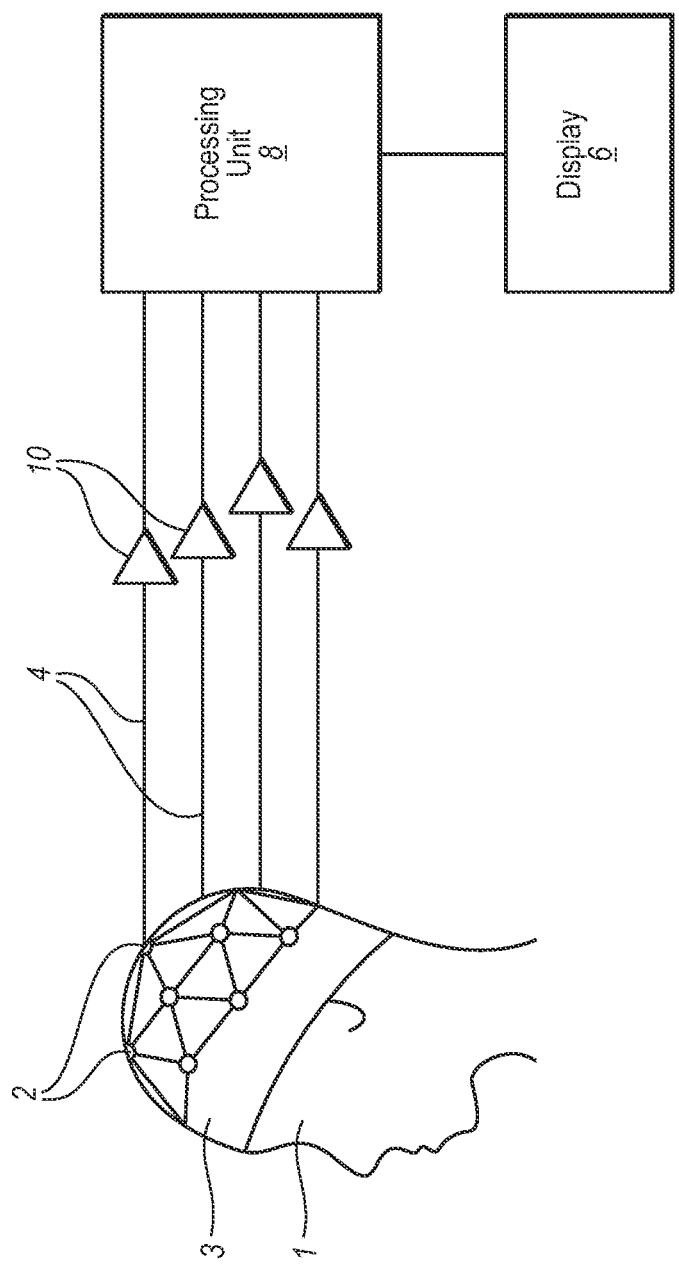
FIG. 1 illustrates an exemplary brain imaging system that may be used in association with the present invention.

FIG. 1 is a diagram illustrating an exemplary system that may be used in association with the present invention. In this embodiment, the system is an EEG system, which is being used to create a display of the electrical activity of a patient's 1 brain. In this embodiment, the EEG system comprises a cap 3 which includes a plurality of electrodes 2 that have been distributed on the cap 3 in according to a predetermined spatial pattern. The electrodes 2 are capable of capturing the electric signals produced by the patient's 1 brain. The captured signals are transmitted from the electrodes 2 to a processing unit 8 via a series of leads 4. In this example, the leads 4 are connected to a series of amplifiers 10 which may amplify the captured signals.

The processing unit 8 is capable of receiving, storing, and performing a plurality of data processing processes on the captured signals in order to create a diagram or picture of the electrical activity of the patient's 1 brain. This diagram or picture is then transmitted to a display 6, where the information may be reviewed by a doctor or other medical professional and used for diagnostic or research purposes. The display may therefore include an image or diagram of the patient's 1 brain. The image of the brain or other area of the patient can be manipulated to present additional views, including rotating along multiple axes, depicted using cut away or layered views, and the like.

One aspect of the present invention is a method of performing medical imaging which uses an algorithm to convert the captured signal into an accurate diagram of the patient's 1 brain activity. In one embodiment, the SAFFIRE algorithm may be applied to the captured data in the processing unit 8, which is capable of performing a series of iterative operations on the data, as more fully described below. As may be understood by one of ordinary skill in the art, the processing unit 8 and display 6 may be combined in a single computing device or distributed among any number of computing devices. Furthermore, embodiments of the invention may also be used in other brain or medical imaging systems including MEGs and the like.

Figure 2:
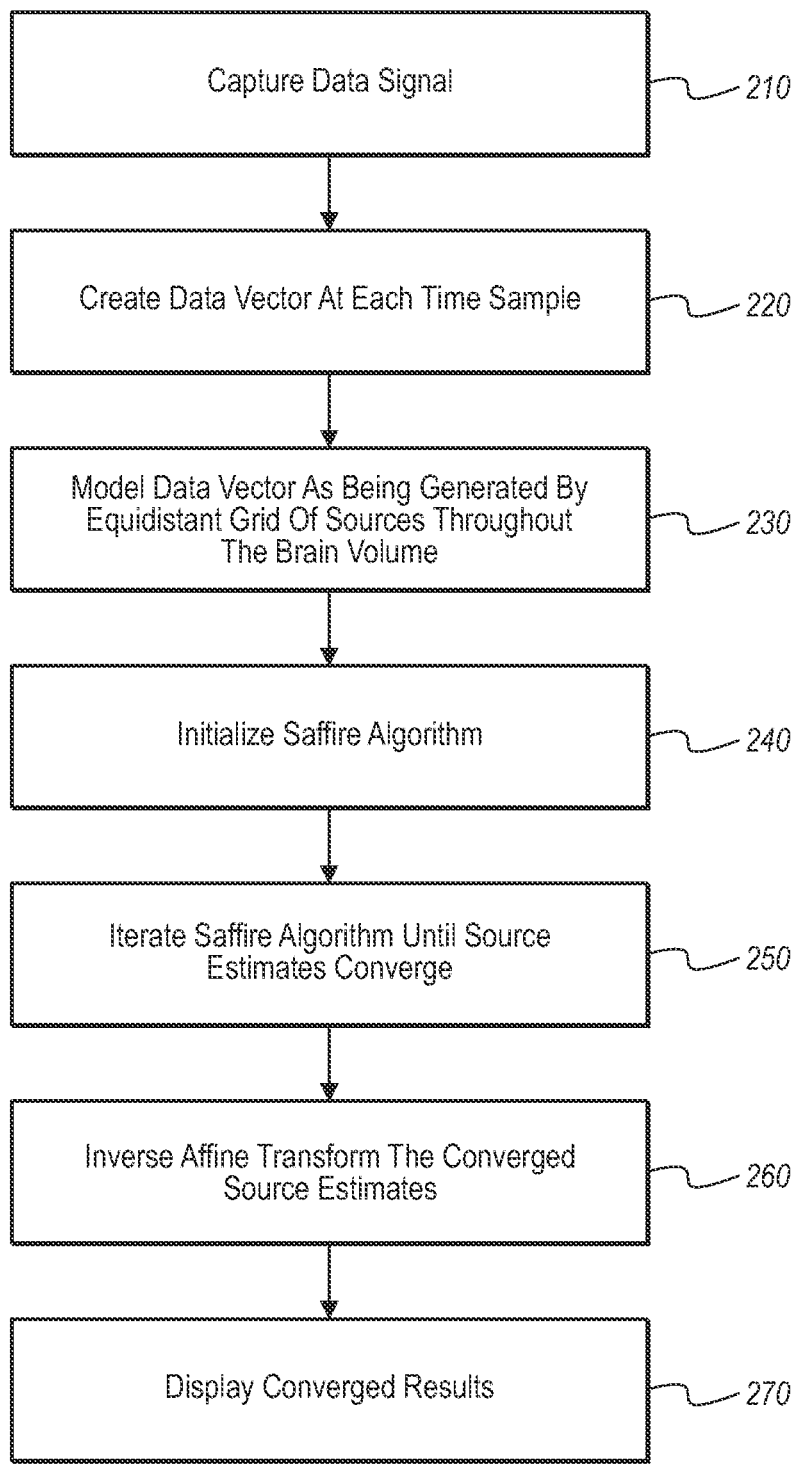
FIG. 2 is a block diagram illustrating a method of the present invention.

FIG. 2 is a block diagram illustrating a method of the present invention. First, a data signal is captured 210 by the system, using a system such as the example mentioned above. Typically, the data signal capturing process comprises placing a series or collection of electrodes on the subject's head (EEG) or an array of (non-contact) pick-up coils arranged about the subject's head (MEG). In the brain imaging embodiment of the invention, this may include using an EEG or MEG system which is capable of capturing the electric activity in the patient's brain at a sampling rate that may be predetermined. As more fully described below, one advantage of the present invention is the ability to generate meaningful results using any number of standard sampling rates of EEG and MEG systems currently used in the art. Typically, such systems operate with a sample rate between 300 Hz and 1 kHz. The electrodes or coils or other sensors can be sampled one at a time, in groups, or all together at substantially the same time when capturing the data signal or signals. Certain electrodes may be sampled at different frequencies.

The data signal capturing process may include exposing the patient to stimuli in order to elicit neural activity by the patient, which may then be captured as electric activity in the patient's brain. In some instances this stimuli may be auditory or visual or tactile or any combination thereof.

Once the electric activity has been captured, a data vector of length equal to the number of sensing electrodes is created 220 at each time sample which contains an aggregate of the signals received from all electrical activity within the brain volume. In one embodiment, the SAFFIRE algorithm is predicated on the assumption that the measurement of electrical and magnetic brain activity via a collection of sensors arranged around the head can be accurately modeled as the superposition of independent responses from M regional signal sources, where each source is characterized by 3 spatial components.

Then, the active primary sources that generate the electromagnetic fields are typically modeled 230 as dipoles sampled on an equidistant grid throughout the brain volume, which is identified from MR images. The forward neuromagnetic model may be based on physical modeling of the volume conductor in which the head and brain compartments of varying electrical conductivities can be accounted for by a single sphere (the standard model in MEG), by multiple spheres fitted to several compartments that are each considered homogeneous (typically used in EEG), or by realistic models incorporating the 3D anatomical information from structural MR images into the discrete formulation of the forward electromagnetic problem based on boundary element methods (BEM).

For a given sampling time, the superposition of received signals at the N sensors (EEG or MEG) can be generally expressed using the forward model as the N-length vectory via $$y = Bx + v \quad (1)$$

where B is the N×3M transformation matrix, x is a 3M×1 vector of dipole component strengths and v is a N×1 vector of additive noise. For EEG/MEG imaging, the transformation matrix B is the so-called leadfield matrix containing the leadfield vectors comprising the $\phi$, $\theta$, and $\rho$ components of the M dipoles in the sample space (based on a spherical coordinate system). Note that in a spherically symmetric volume conductor, currents oriented along the radial direction do not produce any magnetic field outside the volume conductor. Thus, for this standard model in MEG, the leadfield matrix B can be equivalently expressed as a N×2M matrix that transforms a 2M×1 vector of dipole component strengths x (comprised of the $\phi$ and $\theta$ components). A leadfield column vector consists of the electric/magnetic field at the N sensor locations generated by a particular dipole component (either $\phi$, $\theta$, or $\rho$) having unit strength.

Alternatively, any number of models currently known in the art may be used as the approximate model of the captured electrical activity. Currently, various data libraries of such electromagnetic models which describe the sample space are known in the art and embodiments of the invention are not limited to the model described above.

Once the data vector has been obtained, the SAFFIRE algorithm is initialized 240 using a method more fully described below with reference to FIG. 4, which uses an affine-transformed matched filter bank as an initial estimator. One advantage of using this initialization rather than the minimum norm approach currently used in conventional systems is that the matched filter bank does not utilize the ill-conditioned matrix ($BB^H$) so that the resulting estimate is not biased toward local minima. Advantageously, the resulting solutions are less biased to the surface of the model and produce more accurate results.

Using the initial estimate generated in step 240, the system then performs 250 a series of iterations, wherein the SAFFIRE algorithm is repeatedly applied to the estimate, using a method described more fully below with reference to FIG. 3. During this process, the initial affine-transformed matched filter bank estimate may be filtered using a minimum mean-square error or "MMSE" estimator in order to generate a new estimate of the underlying source activity, which is energy normalized and again filtered for a predetermined number of iterations or until the estimations converge to a predetermined degree.

The converged estimate is then 260 inverse affine transformed and sent 270 to the display 6 where a doctor or other medical professional can review the results to determine the measured location and strengths of the dipoles, or energy sources, of the patient's brain.

I. SAFFIRE Algorithm

The SAFFIRE algorithm will now be described. Based on the forward model described above, a minimum mean-square error (MMSE) estimation problem is solved by minimizing the standard MMSE cost function with respect to the filter bank W:

$$J = E\{|x-\hat{x}|^2\} = E\{|x-W^H y|^2\} \quad (2)$$

where $E\{\cdot\}$ denotes the expectation operator, $(\cdot)^H$ is the Hermitian operator, and $\hat{x}$ is the MMSE estimate of x. In one embodiment, the filter bank W is of size 3M×N for EEG imaging and 2M×N for MEG imaging. The cost function in (2) is minimized by differentiating J with respect to W*, where $(\cdot)^*$ denotes complex conjugation, and then setting the result equal to zero. After some manipulation, the MMSE filter bank is found to be $$W = (E\{yy^H\})^{-1} E\{yx^*\} \quad (3)$$

Substituting the forward model (1) into (3) and assuming no correlation between the signal and noise, the MMSE filter bank is thus $$W = (BE\{xx^H\}B^H + E\{vv^H\})^{-1} BE\{xx^H\} \quad (4)$$

The noise covariance matrix $R_v = E\{vv^H\}$ can be estimated directly from the data over a temporal region when no response signal is present. The signal covariance matrix $P = E\{xx^H\}$ generally cannot be determined a priori and thus an iterative strategy is employed such that the MMSE filter bank of (4) can be approximated as $$\hat{W}(k) = (B\hat{P}(k-1)B^H + R_v)^{-1} B\hat{P}(k-1) \quad (5)$$

where $$\hat{P}(k-1) = [\hat{x}(k-1)\hat{x}^H(k-1)] \cdot I \quad (6)$$

in which $\cdot$ is the Hadamard product (element-by-element multiplication) and I is the identity matrix (3M×3M for EEG and 2M×2M for MEG). Given the MMSE filter bank $\hat{W}(k)$ from (5), the estimate of the dipole component strengths at the $k^{th}$ iteration is obtained as $$\hat{x}(k) = W^H(k) y \quad (7)$$

Equations (5), (6), and (7) serve as the core of the SAFFIRE algorithm with convergence generally attained within 10-15 iterations. However, because the forward model in (1) is greatly underdetermined (M>>N) and due to disparate attenuation effects resulting from different dipole depths relative to the brain surface, biasing effects may occur unless a proper initialization is used. To combat these biasing effects, the SAFFIRE algorithm operates in a transformed space and utilizes an initial estimate that is much less ambitious than the minimum-norm solution so as to avoid converging to local minima. These specific characteristics of the SAFFIRE algorithm are more fully described below.

1. Affine Transformation of Solution Space

The $l_2$ norm of the individual leadfield vectors in B may vary considerably because the leadfield matrix incorporates the effects of attenuation induced by transmission through the brain volume. As a result, minimum-norm initializations (such as the initializations used by FOCUSS) tend to produce initial estimates that are biased towards superficial dipole sources. To ameliorate this biasing problem, the SAFFIRE algorithm utilizes an affine transformation of the solution space to remove the norm variations. The initial estimate of the dipole component strengths is then determined within this affine-transformed space.

The affine transformation is based on the equalization of the $l_2$ norms over the leadfield matrix. The transformation matrix D is formulated as $$D = ([B^H B] \cdot I)^{1/2} \qquad (8)$$

which is a diagonal matrix comprised of the $l_2$ norms of the individual columns of the leadfield matrix B. Thus the affine transformation of the solution space is accomplished by re-expressing the forward model of (1) as $$\begin{aligned} y &= Bx + v \\ &= BIx + v \\ &= BD^{-1}Dx + v \\ &= B_a x_a + v \end{aligned} \qquad (9)$$

where the affine-transformed leadfield matrix $B_a = BD^{-1}$ has unit column norms, and $x_a = Dx$ contains the dipole component strengths scaled by the associated column norms of B.

Within the affine transformed space, the iterative estimation procedure of (5), (6), and (7) can be applied by replacing $\hat{x}(k-1)$ with $\hat{x}_a(k-1)$ and replacing B with $B_a$ in the formulation. After the terminal $K^{th}$ iteration, the true estimate of the dipole component strengths can then be obtained via $$\hat{x} = D^{-1} \hat{x}_a(K). \qquad (10)$$

2. Energy Normalization

The low-resolution nature of the matched filter bank tends to spread energy over most, if not all, of the solution space for the initial estimate due to the correlation between leadfield vectors. The subsequent application of the iterative estimation process of (5), (6), and (7) thus facilitates the SAFFIRE algorithm to converge to identify the individual dipole components that are actually active, thereby concentrating the signal energy onto a particular subset of dipole components. However, in the interim iterations the spread of energy over many dipole components tends to result in a scale error that becomes more significant with each successive iteration.

To alleviate this scaling problem SAFFIRE utilizes an energy normalization step within each iteration. The energy normalization ensures that the dipole component estimate at a given iteration, when employed in the forward model (exclusive of noise), would yield a received signal estimate that possesses the same energy as the actual received signal. As such, an estimate of the received signal given the current estimate of the underlying dipole component strengths is computed as $$\hat{y}(k) = B_a \hat{x}_a(k) \qquad (11)$$

with the resulting energy estimate determined as $$\hat{\xi}(k) = \hat{y}^H(k)\hat{y}(k), \qquad (12)$$

Given the energy of the measured received signal as $$\xi_{meas} = y^H y \qquad (13)$$

the energy-normalized dipole component strength estimate is $$\hat{x}_{a,norm}(k) = \sqrt{\frac{\xi_{meas}}{\hat{\xi}(k)}} \, \hat{x}_a(k). \qquad (14)$$

The energy normalization procedure of (11), (12), and (14) is employed after (7) at the end of each iteration of SAFFIRE.

Figure 3:
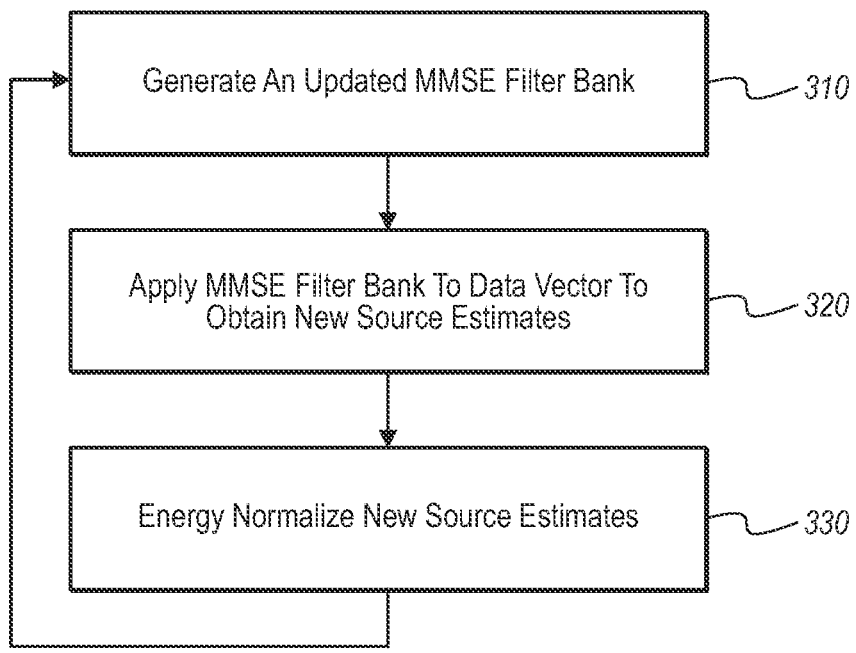
FIG. 3 is a block diagram illustrating the method of performing the SAFFIRE algorithm to estimate the location of dipoles according to the present invention.

Thus, as shown in FIG. 3, the SAFFIRE algorithm comprises 310 generating an updated MMSE filter bank. Then 320 applying the MMSE filter bank to obtain new source estimates. Then an energy normalization process is applied 330 to the new source estimates in order to yield a received signal estimate that possesses the same energy as the true received signal data vector. This process is continued for a predetermined number of iterations, or until the signal estimate converges to a sufficient degree.

3. Noise Covariance Estimate

The MMSE formulation of SAFFIRE naturally contains a term that functions to accommodate the presence of additive noise in the forward model. The noise covariance matrix $R_v = E\{vv^H\}$ can be estimated directly from the measured data as $$\hat{R}_v = \frac{1}{N_{noise}} \sum_{n=1}^{N_{noise}} y_n y_n^H \qquad (15)$$

over the interval of $N_{noise}$ time samples in which no induced response is present. In so doing, the ambient electromagnetic activity is also captured, thus allowing the desired stimulated response to be isolated from the background activity. Also note that the presence of the noise covariance matrix term in the formulation is an additional reason why energy normalization is necessary, even after convergence.

As previously mentioned, in order for the SAFFIRE algorithm to operate successfully, the algorithm requires appropriate initialization. The initialization process is illustrated in FIG. 4, and begins with an initial estimate 410 of the noise covariance matrix over the interval of $N_{noise}$ time samples that do not possess an induced response signal. This estimate is generated using equation (15).

In addition to the initial estimate 410 of the noise, the initialization procedure also requires the signal energy, thus the measured received signal energy for the received signal data vector y at the given time sample is calculated 420 using equation (13). Then the initial affine-transformed matched filter bank estimate of the underlying sources is generated 430, and this estimate is subsequently energy normalized 440 using equations (11), (12), and (14).

Previous iterative approaches such as the FOCUSS algorithm have employed the Moore-Penrose pseudo-inverse to obtain an initial estimate of the dipole component strengths as $\hat{x}_a(0) = B_a^H (B_a B_a^H)^{-1} y$. However, due to severe ill-conditioning of the matrix $(B_a B_a^H)$, the pseudo-inverse method can bias the iterative solution towards local minima thereby yielding estimates that are substantially different from the true solution. In contrast, the SAFFIRE algorithm utilizes a less ambitious approach to obtain the initial solution by employing a matched filter bank for the affine-transformed space as $$\hat{x}_a(0) = B_a^H y. \qquad (16)$$

Because the forward model is greatly underdetermined (M>>N), the matched filter bank initialization provides rather poor spatial resolution due to the correlation between individual leadfield vectors. However, the importance of the matched filter bank initialization is that it provides an initial estimate that does not utilize the ill-conditioned matrix $(B_a B_a^H)$, thereby avoiding the attendant biasing towards local minima. Note that a regularized version of the pseudo-inversed i.e. $\hat{x}_a(0) = B_a^H (B_a B_a^H + \lambda I)^{-1} y$, may also be used to initialize SAFFIRE as long as the regularization term $\lambda$ is very large (often >$10^4$) to offset the ill-conditioning effects of ($B_a B_a^H$) Of course, as $\lambda$ increases, the regularized pseudo-inverse essentially converges to a scaled version of the matched filter. Thus, one embodiment for SAFFIRE initialization is to employ the matched filter as in (16).

Then, the matched filter bank estimate is energy-normalized 440 in order to provide an initial solution for the SAFFIRE algorithm.

Figure 4:
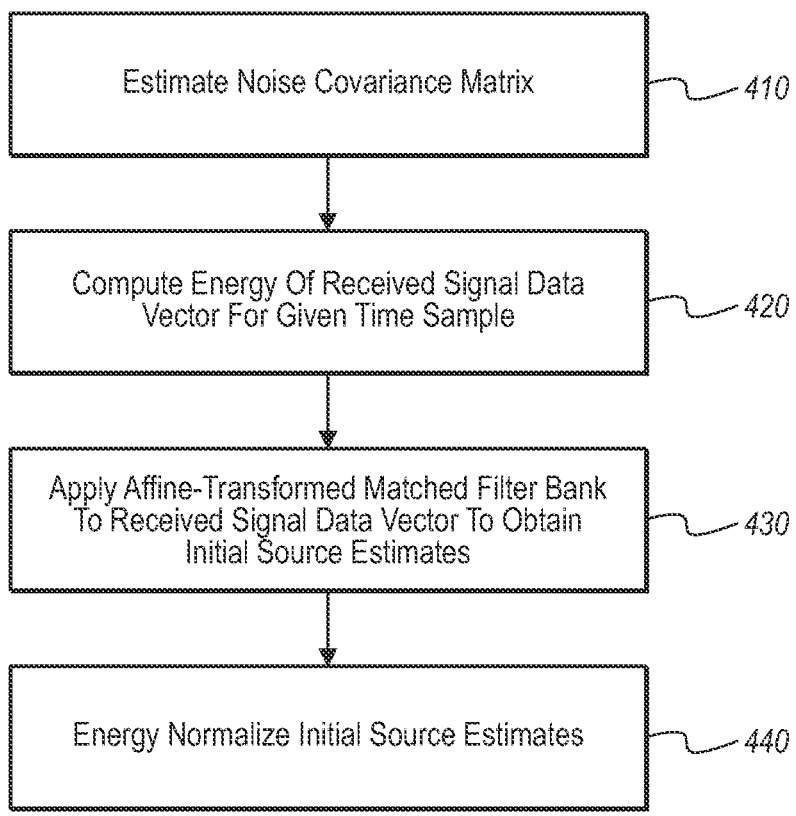
FIG. 4 is a block diagram illustrating the initialization procedure required to perform the SAFFIRE algorithm of the invention.

With reference to FIGS. 3 and 4, the basic steps for performing the SAFFIRE algorithm is as follows:

4. Implementation of the Basic SAFFIRE Algorithm
Initialization:
i) Compute 410 estimate of noise covariance matrix $$\hat{R}_v = \frac{1}{N_{noise}} \sum_{n=1}^{N_{noise}} y_n y_n^H$$

over the interval of $N_{noise}$ time samples that do not possess an induced response signal.

ii) Compute 420 the measured received signal energy $\zeta_{meas} = y^H y$ for the received signal y at the time sample of interest.

iii) Compute 430 the matched filter bank estimate of the affine-transformed dipole component source strengths as $\hat{x}_a(0) = B_a^H y$.

iv) Energy-normalize 440 the matched filter bank estimate as $$\hat{y}(0) = B_a \hat{x}_a(0)$$
$$\hat{\xi}(0) = \hat{y}^H(0)\hat{y}(0)$$
$$\hat{x}_{a,norm}(0) = \sqrt{\frac{\zeta_{meas}}{\hat{\xi}(0)}} \hat{x}_a(0)$$

Operation:
For k=1, 2, ..., K iterations, generate an updated MMSE filter bank 310 using $$P(k-1) = [\hat{x}_{a,norm}(k-1)\hat{x}_{a,norm}^H(k-1)] \cdot I \text{ and} \qquad 1)$$

$$\hat{w}(k) = (B_a \hat{P}(k-1)B_a^H + \hat{R}_v)^{-1} B_a \hat{P}(k-1) \qquad 2)$$

Where the resulting new estimate of the dipole component sources 320 is obtained by applying the MMSE filter bank as $$\hat{x}_a(k) = \hat{W}^H(k)y. \qquad 3)$$

Then, energy-normalize 330 the new source estimates using $$\hat{y}(k) = B_a \hat{x}_a(k) \qquad 4)$$
$$\hat{\xi}(k) = \hat{y}^H(k)\hat{y}(k) \qquad 5)$$
and
$$\hat{x}_{a,norm}(k) = \sqrt{\frac{\zeta_{meas}}{\hat{\xi}(k)}} \hat{x}_a(k). \qquad 6)$$

Termination:
Inverse affine transform 260 to compute the actual dipole component strength estimate as $\hat{x} = D^{-1}\hat{x}_a(K)$.

II. Specific Features and Options of the SAFFIRE Algorithm
While not part of the basic SAFFIRE algorithm, the following optional techniques can be used to facilitate further performance gain for the application to MEG/EEG imaging: 1) incoherent integration of multiple time samples of received data, and 2) re-processing with volumetric constraints.

1. Incoherent Integration

To increase the signal-to-noise ratio (SNR) of the desired response signal and thus potentially improve the image accuracy, temporal integration may be employed. Because the exact nature of the response signal is not known a priori and because the basic SAFFIRE algorithm is applicable to the received signal for a single time sample, this integration must be performed incoherently. Let Y be the collection of received signal vectors over an interval of L time samples denoted as $$Y = [y(1)y(2) \ldots y(L)] \qquad (17)$$

such that Y is N×L Note that these L time samples may or may not be consecutive. If the time samples are consecutive and the response signal is relatively stationary over the corresponding time interval, then the incoherent integration process will reinforce the signal components resulting in an SNR gain, though at the cost of a commensurate reduction in temporal resolution. Alternatively, if the time samples are from different time epochs corresponding to different responses, then their incoherent integration will yield an estimator that is generalized to operate over all the L represented time epochs. This latter implementation is useful for generating accurate EEG/MEG time courses which may consist of different spatial responses at different times.

The incoherent integration procedure is applied in step 1 of each iteration described above. Steps ii), iii), and iv) of the SAFFIRE initialization are performed individually on each of the L time samples to obtain L initial energy-normalized, affine-transformed matched filter bank estimates denoted as $\hat{x}_{a,norm,1}(0), \hat{x}_{a,norm,2}(0), \ldots, \hat{x}_{a,norm,L}(0)$ for the L time samples. The individual estimates are then combined incoherently in step 1 of the first iteration as $$\hat{P}(0) = \frac{1}{L}\left[\sum_{\ell=1}^{L} \hat{x}_{a,norm,\ell}(0)\hat{x}_{a,norm,\ell}^H(0)\right] \cdot I \qquad (18)$$

which is subsequently used to determine the MMSE-based filter bank $\hat{W}(1)$ in step 2. This filter bank is then applied to each of the L received signal vectors as in step 3 followed by the L individual energy normalizations in steps 4, 5, and 6. In general, the L estimate vectors obtained in step 6 of a given iteration are combined in step 1 of the following iteration as $$\hat{P}(k-1) = \frac{1}{L}\left[\sum_{\ell=1}^{L} \hat{x}_{a,norm,\ell}(k-1)\hat{x}_{a,norm,\ell}^H(k-1)\right] \cdot I. \qquad (19)$$

2. Re-Processing with Volumetric Constraints

The SAFFIRE algorithm has been found to perform very well at accurately identifying the spatial locations of brain activity regions. This spatial accuracy may be exploited to facilitate even greater accuracy by using the processed results to determine the volumetric region(s) of the brain in which activity is present during the time interval of interest. In so doing, the size of the leadfield matrix may be significantly reduced so as to only encompass a constrained region around the previous dipole estimate locations. This reduction is accomplished by replacing $B_a$ in the SAFFIRE algorithm with $\tilde{B}_a$ that contains the subset of leadfield vectors corresponding to the constrained spatial region(s). Subsequently re-processing the received data with the volume-constrained SAFFIRE algorithm allows for much less spatial ambiguity such that further image accuracy can be achieved. Alternatively, the active spatial regions identified by SAFFIRE may be utilized as a priori knowledge for other EEG/MEG approaches that require such information (e.g. ref. 12, 13).

III. Performance Demonstration

The SAFFIRE algorithm has been evaluated using computer simulations that allow an objective assessment of the localization accuracy for known source parameters. Several examples of dipole source reconstruction are illustrated in FIGS. 5A-14B, which demonstrate the advantages of SAFFIRE compared to other schemes in terms of their performance. The simulation experiments were conducted using the sensor setup of the CTF Omega system with 151 sensors (axial gradiometers with 5 cm baseline). The source space was defined as a regular grid of 9014 points spaced at an averaged distance of 5 mm within the brain volume segmented from the MRI of one subject. A spherical volume conductor was used throughout the simulation experiments.

1. Performance Evaluation for a Simulated Pair of Dipolar Sources that are Mirrored in Respect to the Mid-Saggital Plane FIGS. 5A-9B illustrate the performance of SAFFIRE, MNE and FOCUSS algorithms for the localization of two simulated dipole sources located within relatively deep regions of the auditory cortex in each of the two brain hemispheres.

Figure 5A:
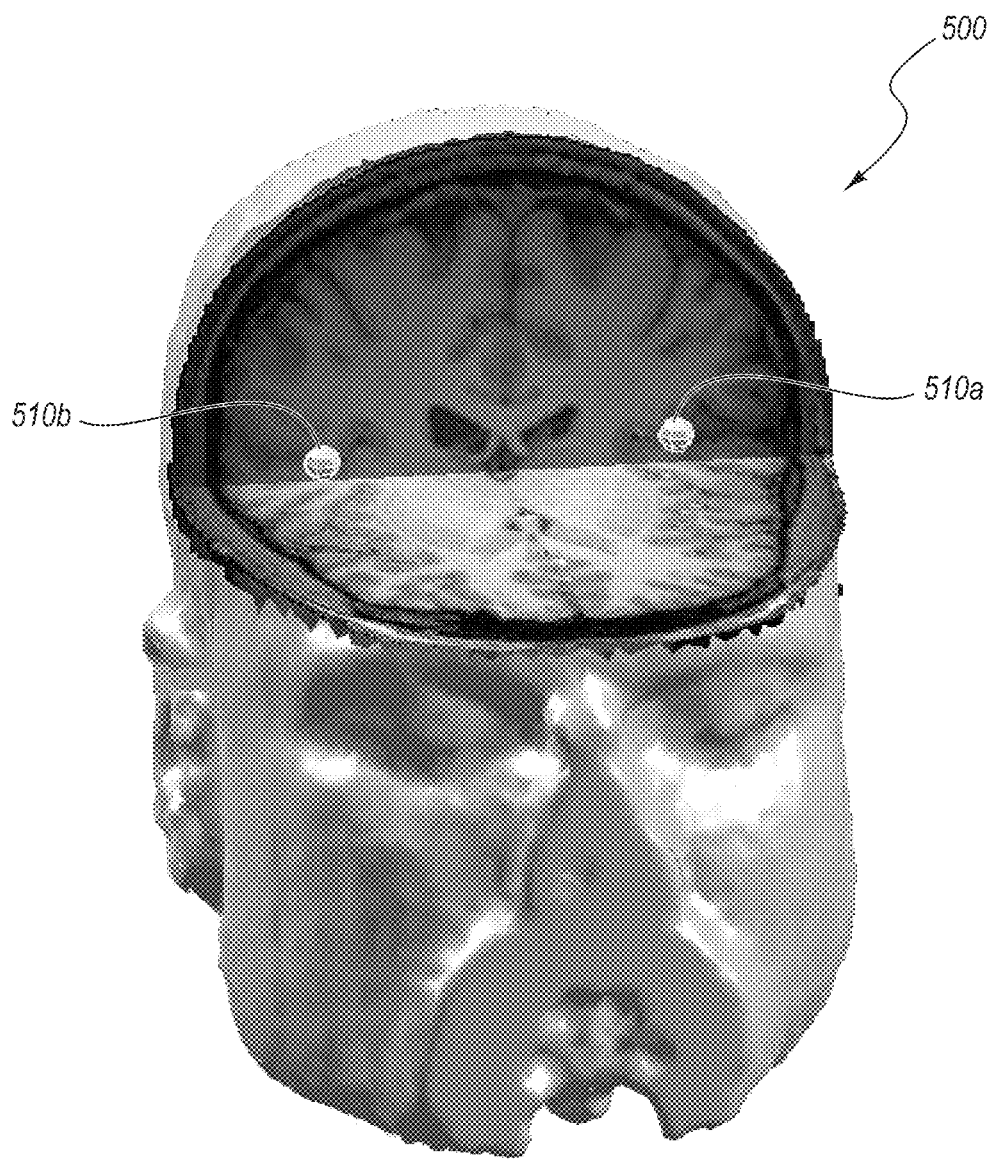
FIGS. 5A-5C illustrate the setup for a first simulation experiment using pair of dipolar sources.
Figure 5B:
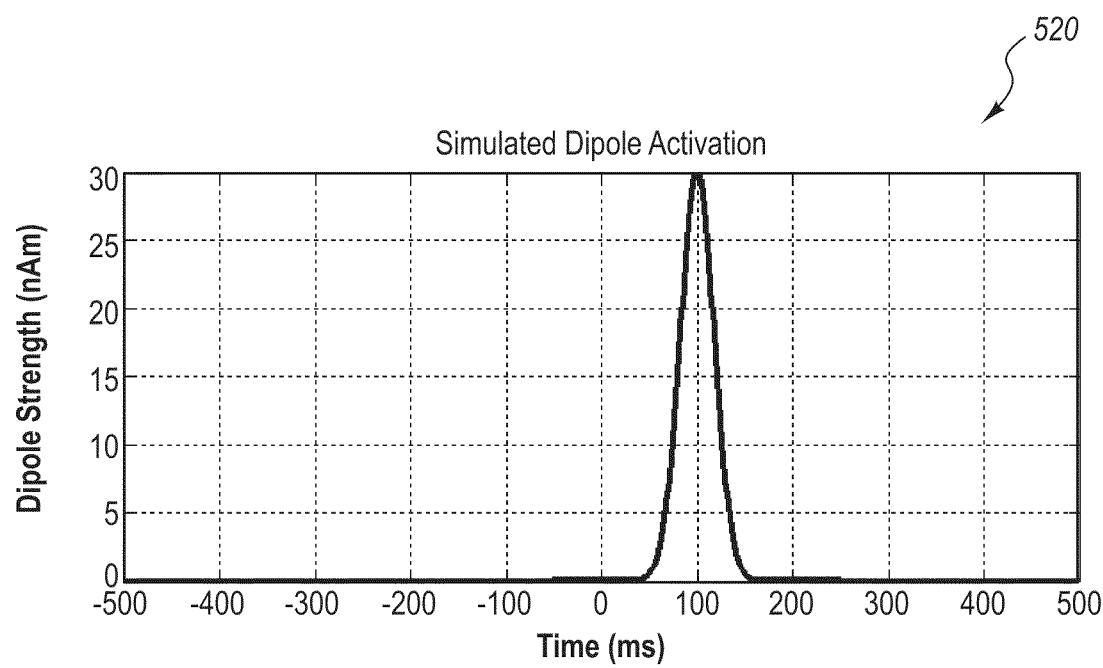
Figure 5C:
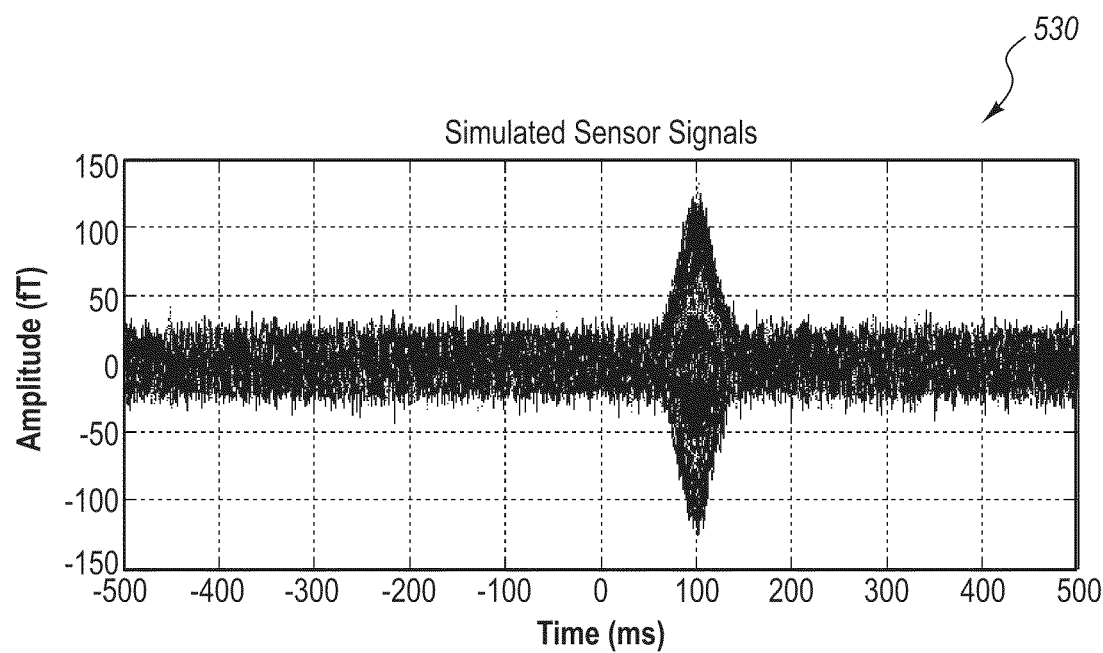

FIG. 5A illustrates the location of the simulated dipolar sources 510a and 510b in a 3-dimensional plot 500 that allows the visualization of the MR coronal and axial slices that are close to the simulated dipoles. The simulated temporal course of the dipoles activations (derived from a gaussian function peaking at 100 ms, sources fully correlated) is shown in the graph 520 shown in FIG. 5B. The corresponding simulated sensor data is shown in the graph 530 of FIG. 5C, with all the sensor signals overlaid. A zero-mean, random noise was added to the simulated MEG data, with the rms noise level of 10 fT.

Figure 6A:
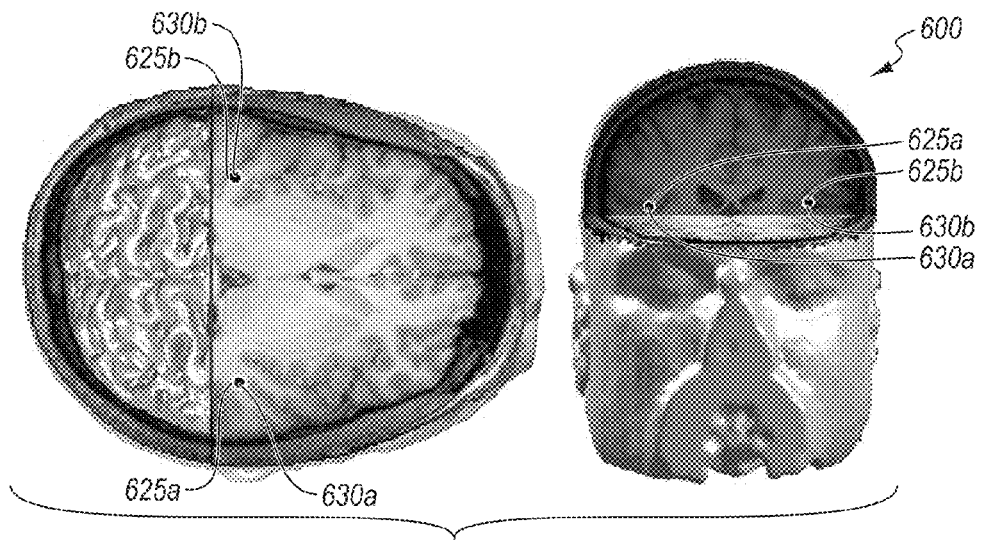
FIGS. 6A-6C illustrate the results of the localization of the dipolar sources of FIGS. 5A-5C using the method of the present invention at one time sample.
Figure 6B:
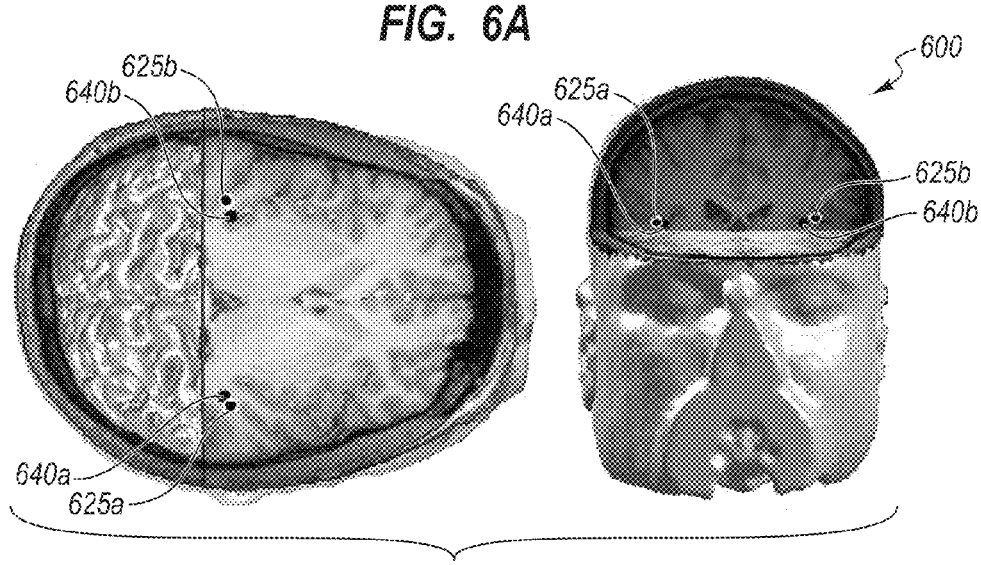
Figure 6C:
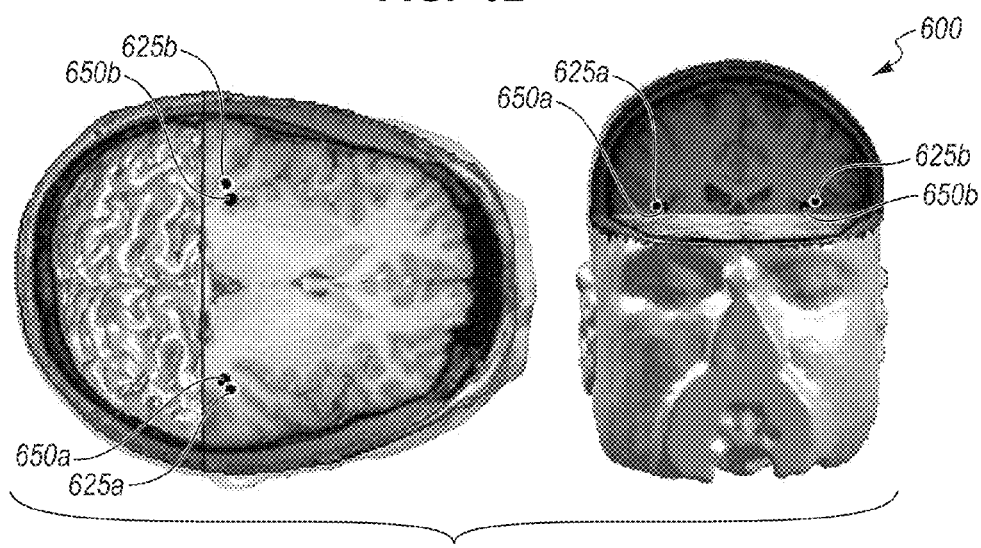

FIGS. 6A-6C illustrate top and front 3-dimensional views of the source localization using SAFFIRE with 1 time sample, selected at the peak of the dipoles activity (100 ms latency). FIGS. 6A-6C illustrate the results at three clipping thresholds: 50%, 20% and 5% of the maximum strength, respectively. In FIG. 6A, the simulated source positions are shown as white dots 625a and 625b on the three-dimensional model 600, while the reconstructed source locations are shown as black dots 630a and 630b. FIG. 6B shows the reconstructed source locations of 640a and 640b at 20% of the maximum strength, and FIG. 6C shows the reconstructed source locations of 650a and 650b that result when the algorithm is used at a clipping threshold of 5% of the maximum strength.

Figure 7A:
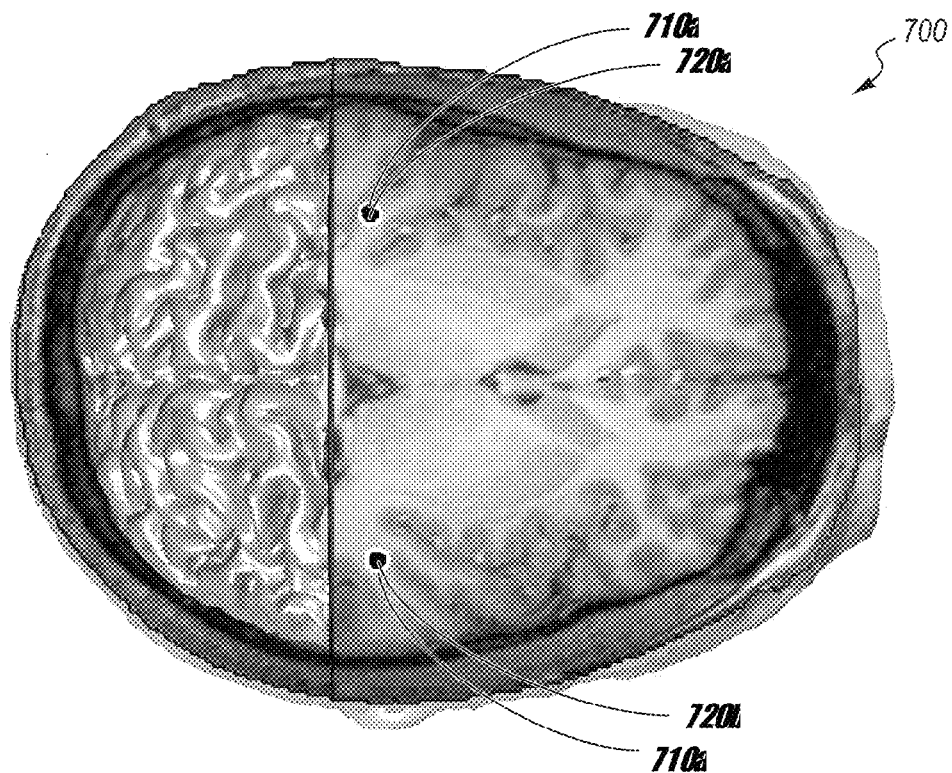
FIGS. 7A-7D illustrate the results of the localization of the dipolar sources of FIGS. 5A-5C using the method of the present invention at four time samples.
Figure 7B:
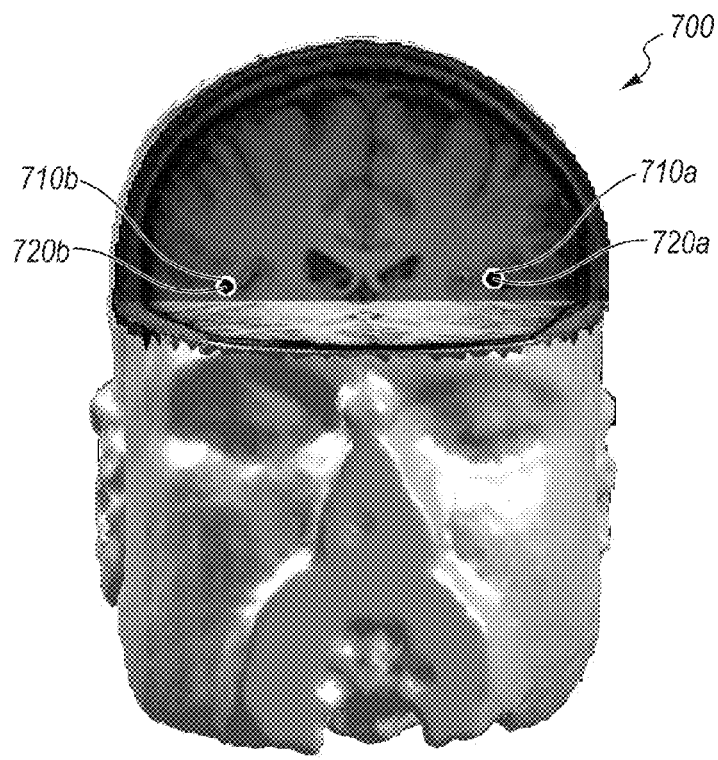

The results prove the ability of SAFFIRE to correctly localize the two sources. The energy of the reconstructed sources is very focal and in the correct dipole positions. Only a small fraction of the sources power is retrieved at a nearby point for each of the simulated sources (visible at 20% and 5% clipping thresholds). Similarly, FIGS. 7A and 7B illustrate the results obtained using SAFFIRE with 4 time samples combined via incoherent integration, wherein the sources have estimated strengths greater than only 1% of the maximum strength. As with the previous example, the simulated source positions are shown as white dots 710a and 710b on the three-dimensional model 700, while the reconstructed source locations are shown as black dots 720a and 720b. This result proves the super-resolution that can be achieved by the algorithm, and in the absence of any localization bias.

Figure 7C:
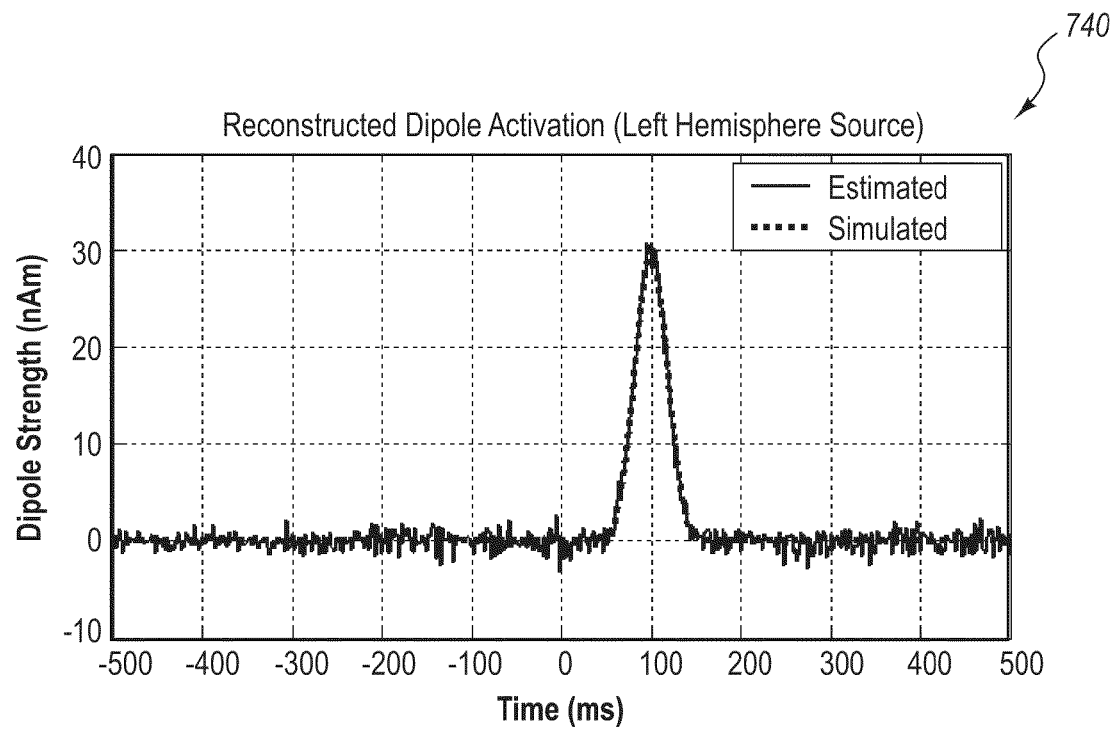
Figure 7D:
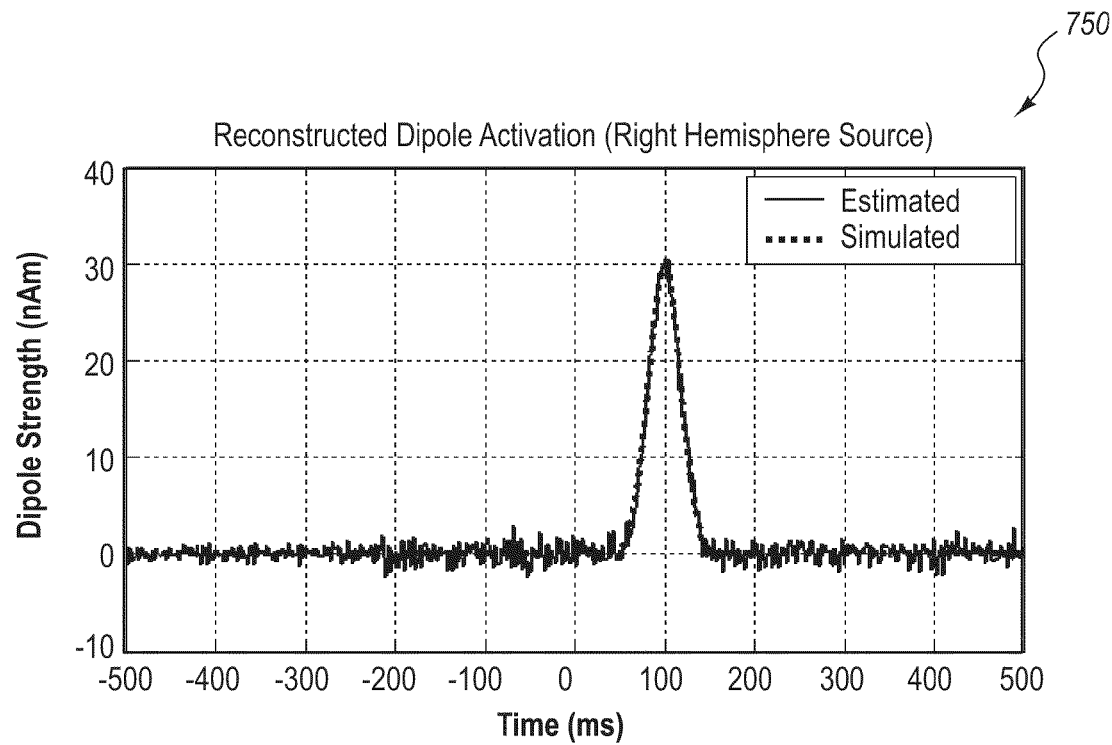

FIGS. 7C and 7D are graphs 740 and 750, respectively, which illustrate the reconstructed time-courses of activity for each of the two sources, obtained using SAFFIRE with 4 time samples. The results indicate a very good match between the simulated and the reconstructed curves. In all cases, the SAFFIRE algorithm was used in a scheme with 10 iterations. Moreover, while the results are not depicted herein, this scenario with active dipoles that are symmetric in the two hemispheres is known to cause significant degradation for the LCMV beamformer and the Synthetic Aperture Magnemometry approaches known in the art due to temporal correlation of the two spatially-separated dipole sources.

Figure 8A:
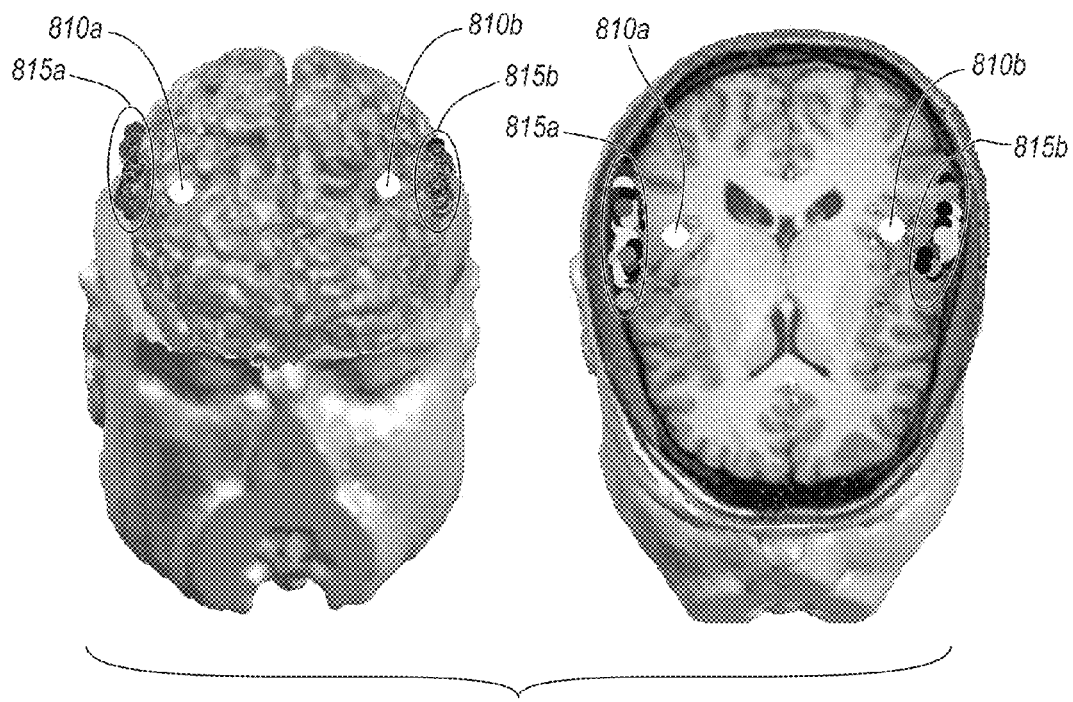
FIGS. 8A-8D illustrate the results of a the localization of the dipolar sources of FIGS. 5A-5C using two different MNE methods currently known in the art.
Figure 8B:
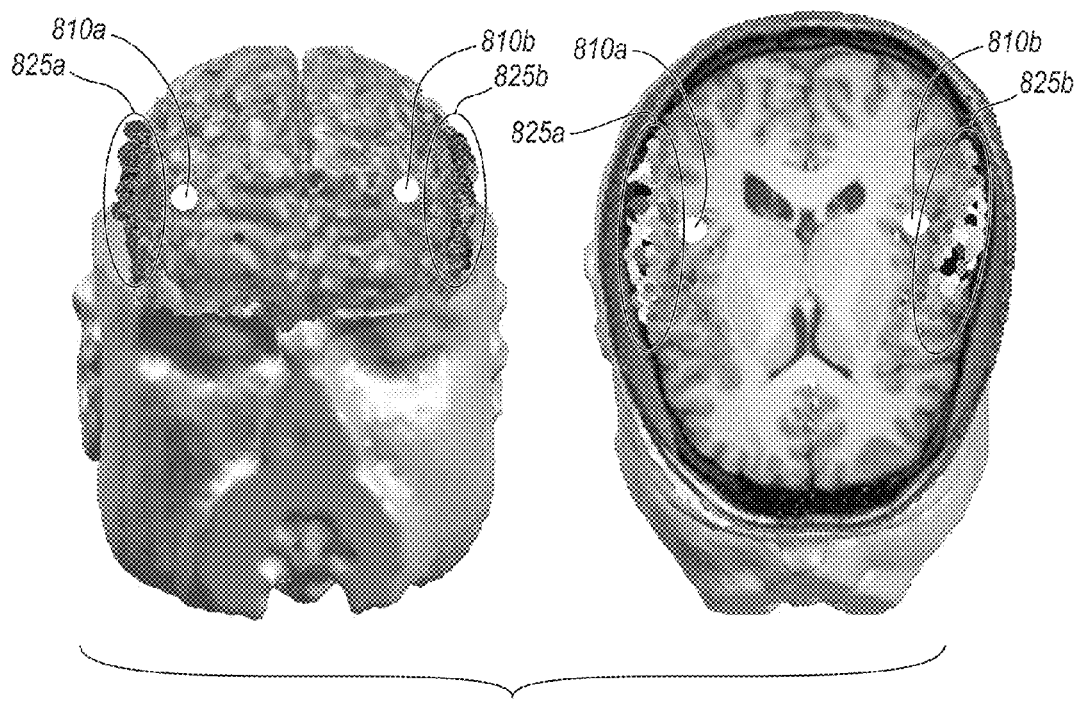
Figure 8C:
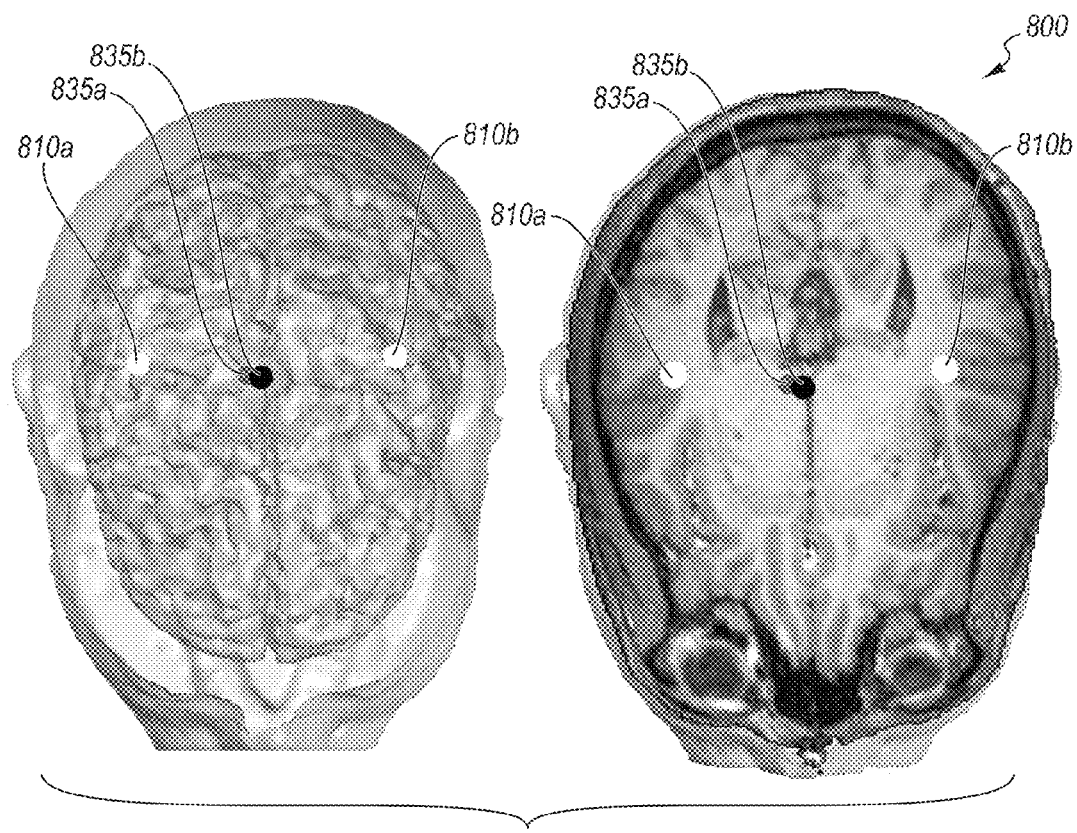
Figure 8D:
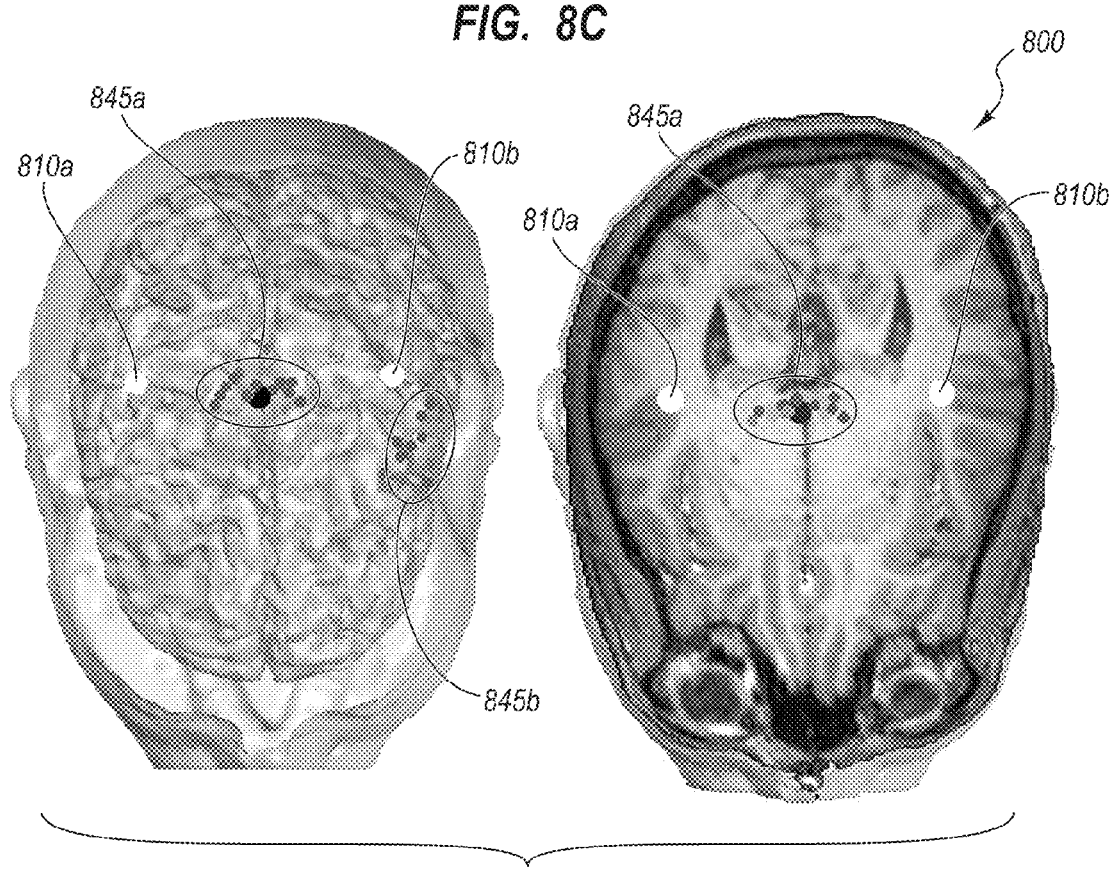

FIGS. 8A-8D illustrate the results retrieved by two different MNE algorithms known in the art using a 3-dimensional view of the brain 800, with a sectioned 3-dimensional view along the axial plane for better visualization. FIGS. 8A-8B illustrate the localization results obtained using a regularized MNE, with sources having estimated strength greater than 50% and 20% of the maximum, respectively, while FIGS. 8C-8D illustrate the results obtained using a regularized MNE with normalized leadfields (hence to forth referred to as nMNE), with sources having estimated strength greater than 50% and 20% of the maximum, respectively. The Tikhonov regularization was used with each of the two algorithms, and the optimum regularization parameter was separately estimated using the L-curve method. In FIGS. 8A-8D, the actual, simulated source positions are marked with white dots 810a and 810b, while the retrieved sources are shown with various grey-scale dots. Thus, in FIG. 8A, the localization results obtained using a regularized MNE with sources having strength greater than 50% of the maximum resulted in retrieved sources at positions 815a and 815b, while in FIG. 8B, the localization results obtained using a regularized MNE with sources having strength greater than 20% of the maximum resulted in retrieved sources at positions 825a and 825b. In comparison, as shown in FIG. 8C, the localization results obtained using a regularized nMNE with sources having strength greater than 50% of the maximum resulted in retrieved sources at positions 835a and 835b, and as shown in FIG. 8D, the localization results obtained using a regularized nMNE with sources having strength greater than 20% of the maximum resulted in retrieved sources at positions 845a and 845b. The results clearly indicate the bias of the MNE methods towards more superficial sources (shifted in the medio-lateral direction, closer to the sensors), as well as its over-smoothing effect, both of which are well documented by previous studies. Moreover, the nMNE results indicate that the leadfield normalization strategy is vulnerable to over-compensation effects leading to a bias for deep sources in regions near the center of the volume conductor.

Figure 9A:
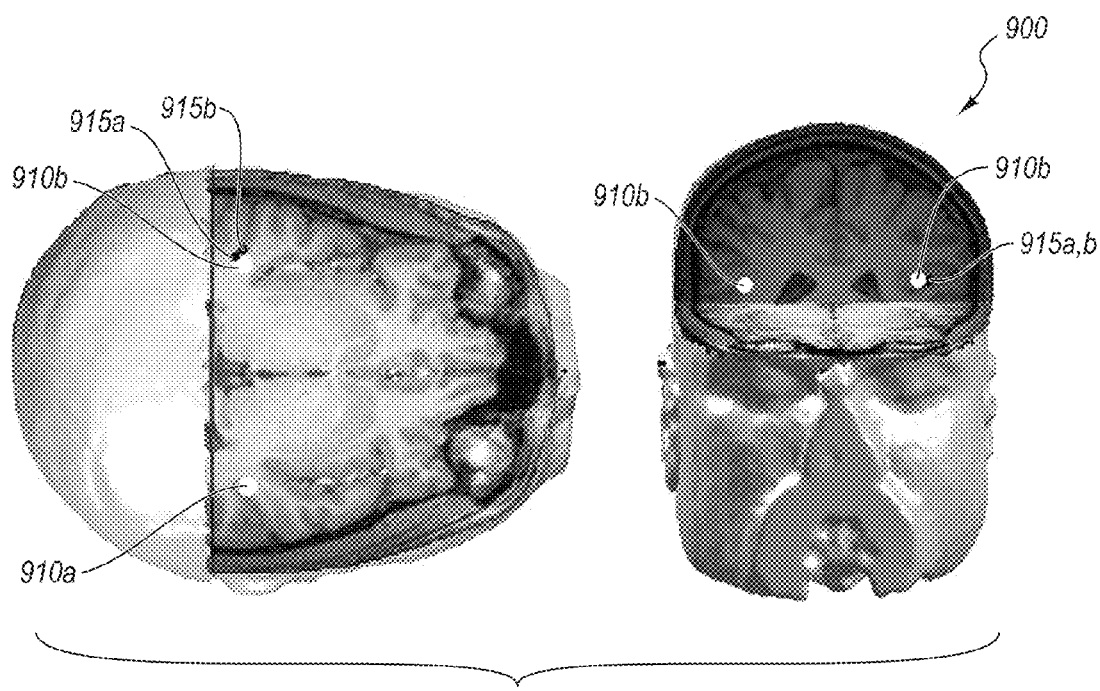
FIGS. 9A-9B illustrate the results of the localization of the dipolar sources of FIGS. 5A-5C using the FOCUSS method currently known in the art.
Figure 9B:
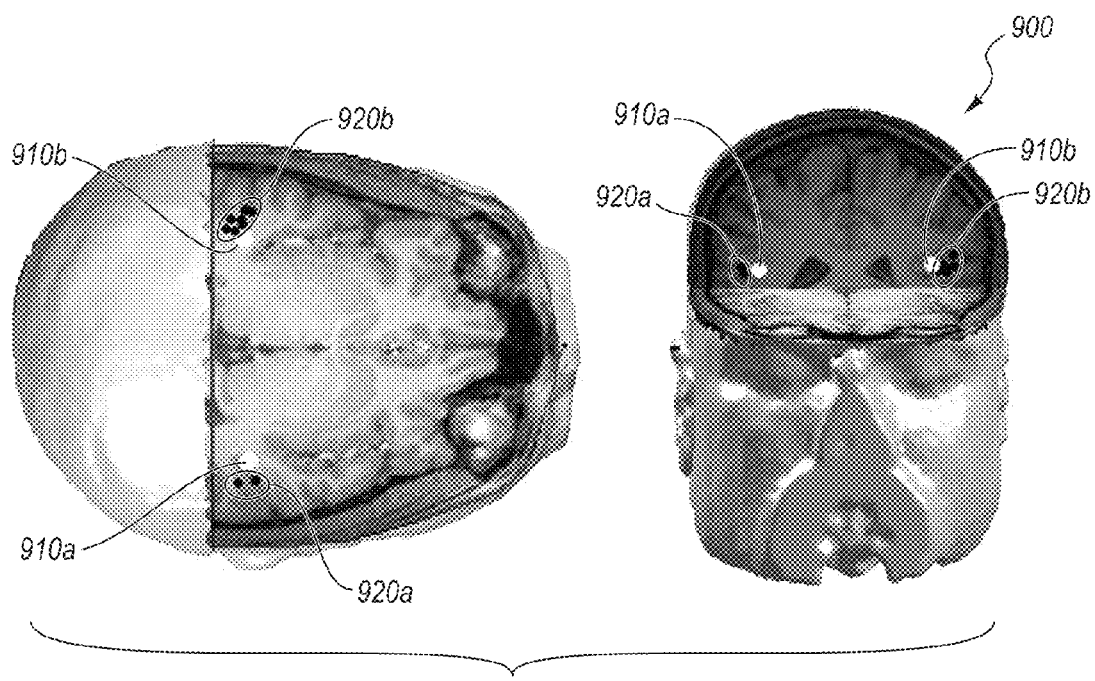

FIGS. 9A-9B illustrate the results obtained by using the FOCUSS algorithm. FIGS. 9A and 9B illustrate the localization results obtained using the FOCUS, with sources having estimated strength greater than 50% and 20% of the maximum, respectively. FOCUSS has been applied in its compound version, with the weight matrix of each iteration being obtained from the compound product of all the preceding solutions. A truncated SVD scheme was used, with 30 non-zero singular values. In FIG. 9A, the actual, simulated source positions are marked on the 3-dimensional model 900 with white dots 910a and 910b, with the localization results obtained using the FOCUSS algorithm with sources having strength greater than 50% of the maximum resulted in retrieved sources at positions 915a and 915b. In FIG. 9B, the localization results obtained using the FOCUSS algorithm with sources having strength greater than 20% of the maximum resulted in retrieved sources at positions 920a and 920b.

As shown by our results, FOCUSS provides more focal solutions and it can improve the localization accuracy in respect to MNE algorithms. However, FOCUSS can not achieve the same degree of localization accuracy when compared to SAFFIRE.

2. Performance Evaluation for a Simulated Pair of Nearby Dipolar Sources

Figure 10A:
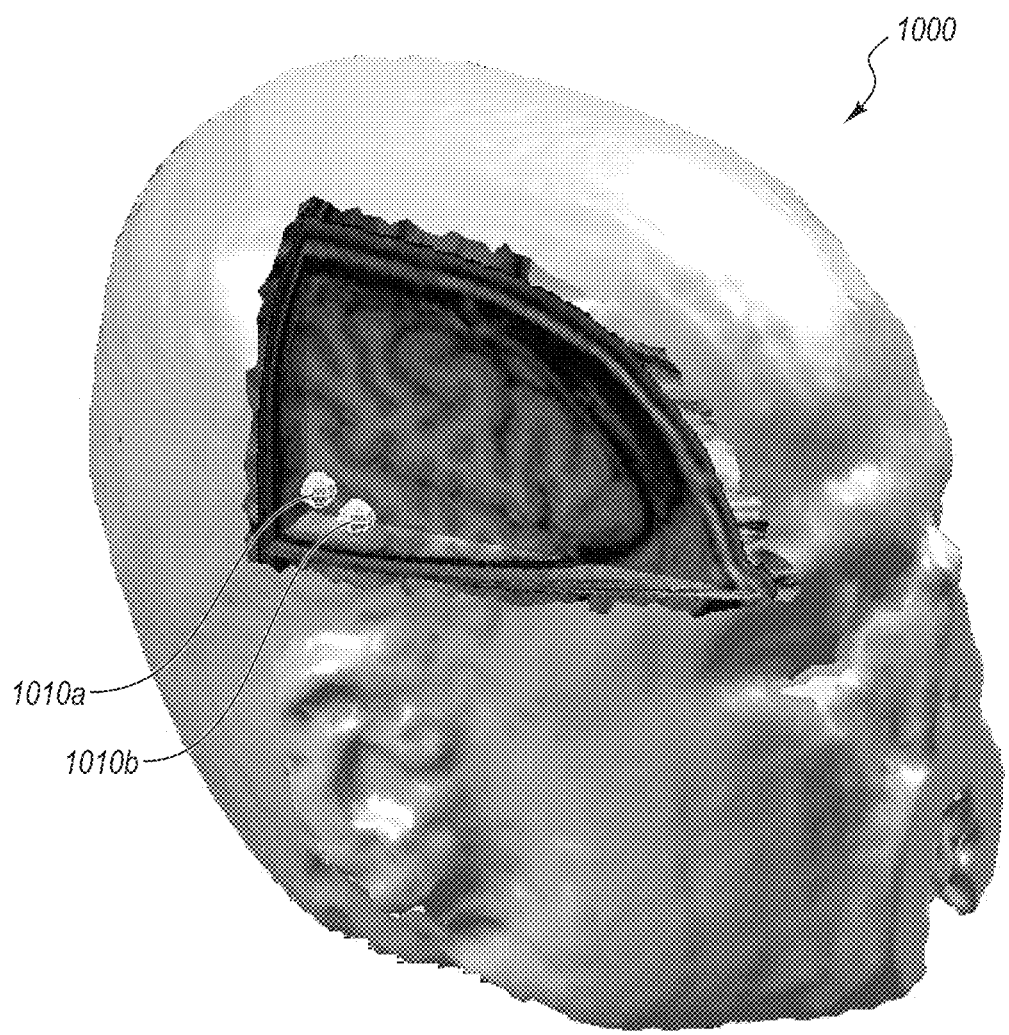
FIGS. 10A-10C illustrate the setup for a second simulation experiment using another simulated pair of dipolar sources.
Figure 10B:
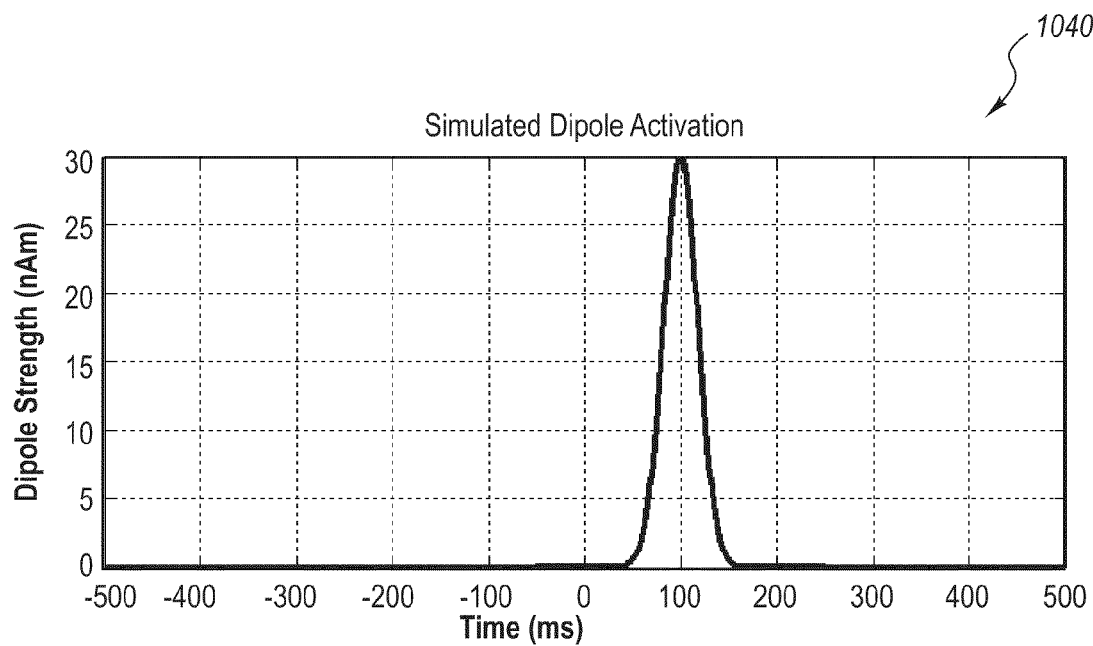
Figure 10C:
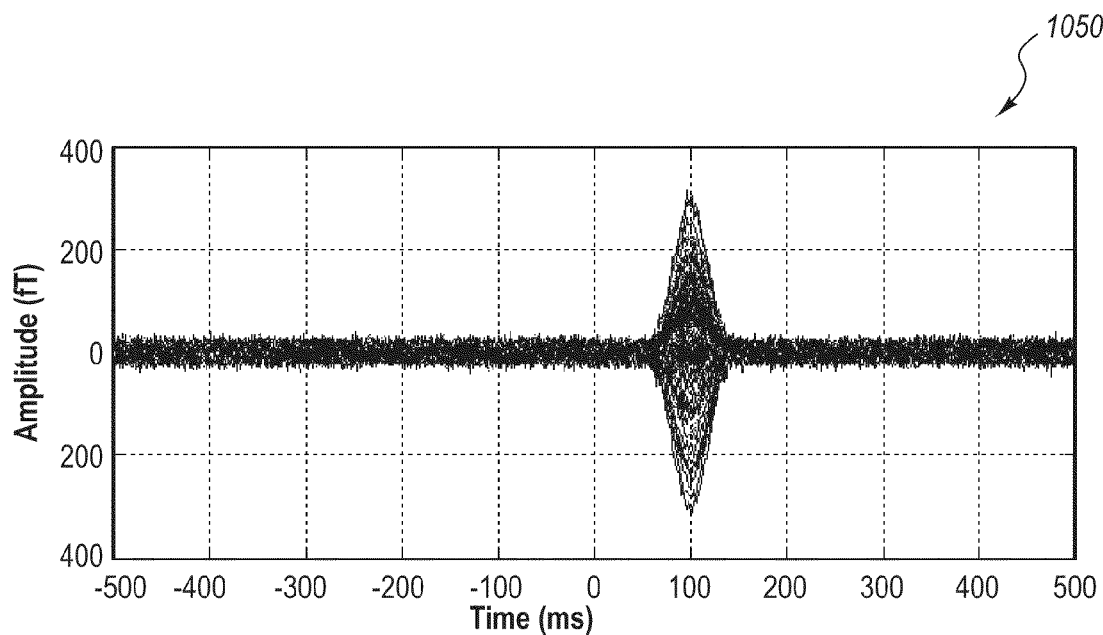

FIGS. 10A-14B illustrate the performance of SAFFIRE as compared to other estimators known in the art for two nearby sources selected in regions within the auditory cortex of one hemisphere. FIG. 10A illustrates the location of the simulated dipolar sources 1010a and 1010b in a 3-dimensional plot 1000 that allows the visualization of the adjacent orthogonal MR slices. The simulated temporal course of the dipoles activations (peaking at 100 ms, sources fully correlated) is shown in the graph 1040 illustrated in FIG. 10B. The corresponding simulated sensor data is shown in the graph 1050 illustrated in FIG. 10C, with all sensor signals being overlaid. Similarly with the previous simulation experiment, a zero-mean, random noise was added to the simulated MEG data, with the rms noise level of 10 fT.

Figure 11A:
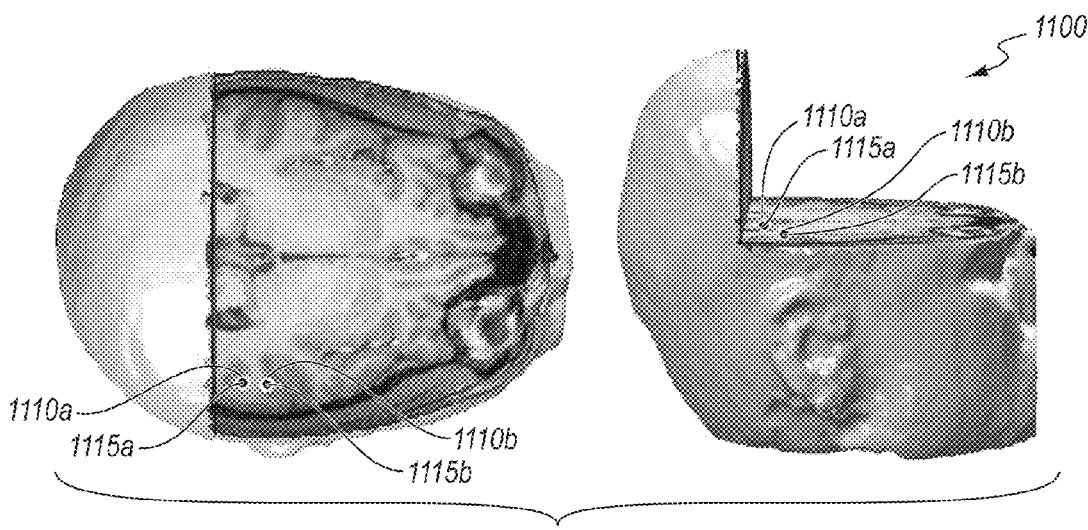
FIGS. 11A-11C illustrate the results of the localization of the dipolar sources of FIGS. 10A-10C using the method of the present invention at one time sample.
Figure 11B:
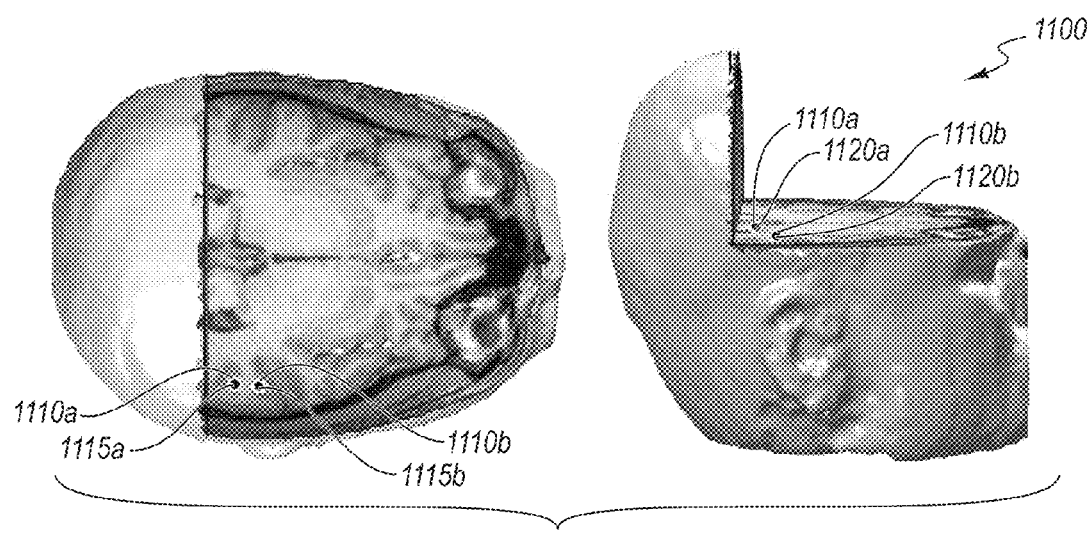
Figure 11C:
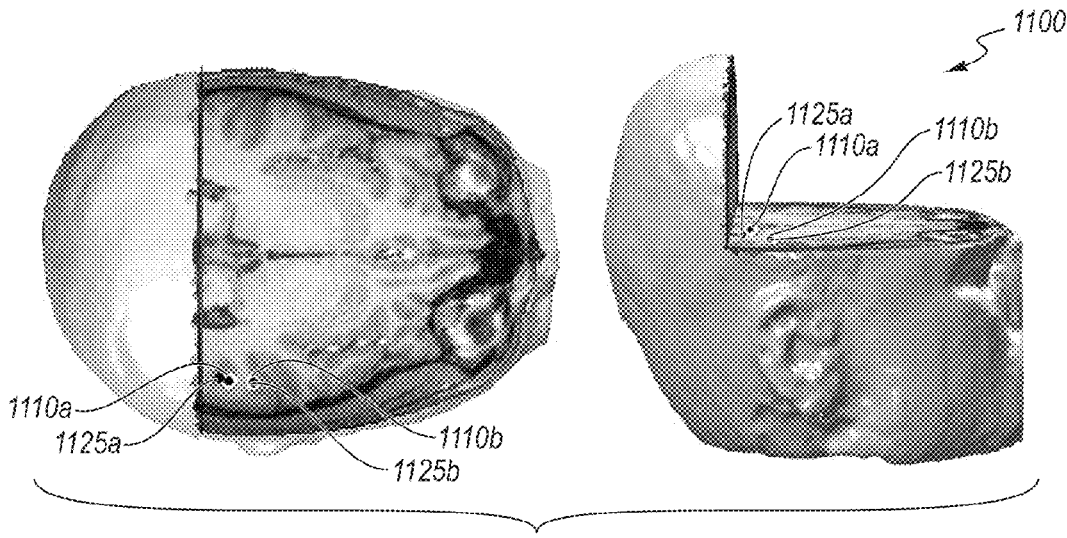

FIGS. 11A-11C illustrate top and front 3-dimensional views 1100 of the source localization using SAFFIRE with 1 time sample, selected at the peak of the dipoles activity (100 ms latency). FIGS. 11A-11C illustrate the results at three clipping thresholds: 50%, 20% and 5% of the maximum strength, respectively. In FIGS. 11A-11C, the simulated source positions are shown as white dots 1110a and 1110b. As shown in FIG. 11A the result of the SAFFIRE algorithm at a clipping threshold of 50% resulted in reconstructed source locations shown as black dots 1115a and 1115b. Similarly, FIG. 11B illustrates the results of the SAFFIRE algorithm at a clipping threshold of 20% of maximum strength, which resulted in reconstructed source locations 1120a and 1120b, and FIG. 11C, which was performed at a clipping threshold of 5% of the maximum strength resulted in reconstructed source locations 1125a and 1125b.

These results confirm the ability of SAFFIRE to correctly localize the two nearby sources. The energy of the reconstructed sources is very focal and is localized at the correct dipole positions, thus allowing for discrimination of the two generators of magnetic field despite the fact that they are separated by a relatively small distance of 1 cm. Only a very small fraction of the sources power is retrieved at a point nearby one of the two simulated sources (visible only at 5% clipping threshold).

Figure 12A:
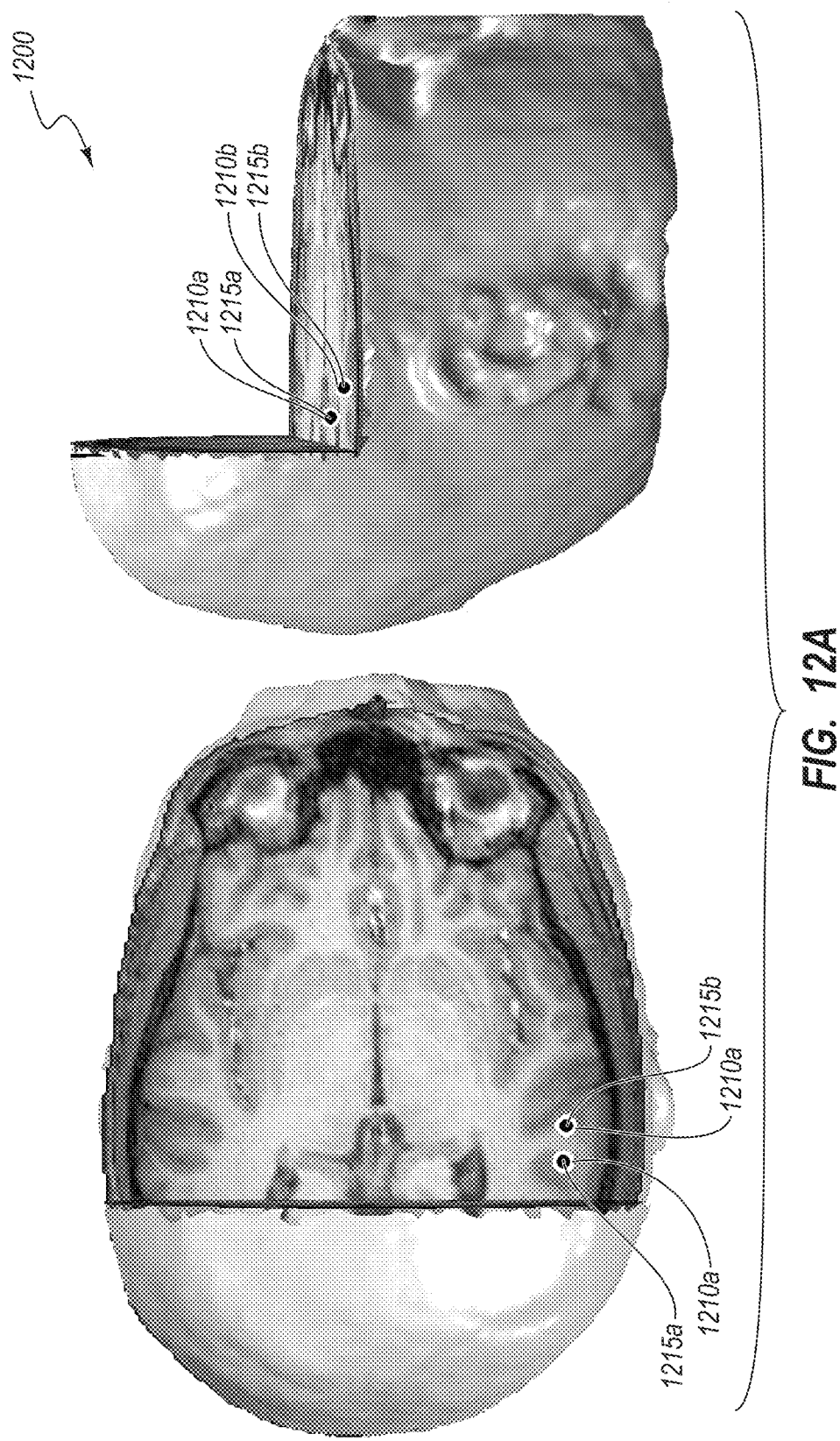
FIGS. 12A-12C illustrate the results of the localization of the dipolar sources of FIGS. 10A-10C using the method of the present invention at four time samples.
Figure 12B:
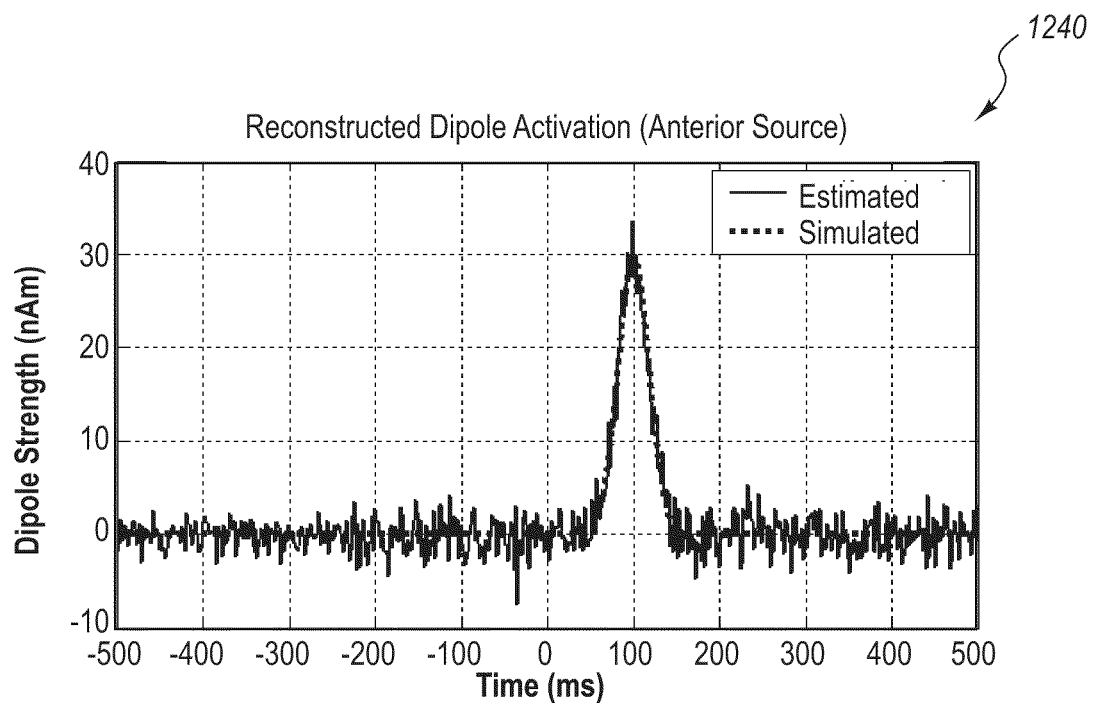
Figure 12C:
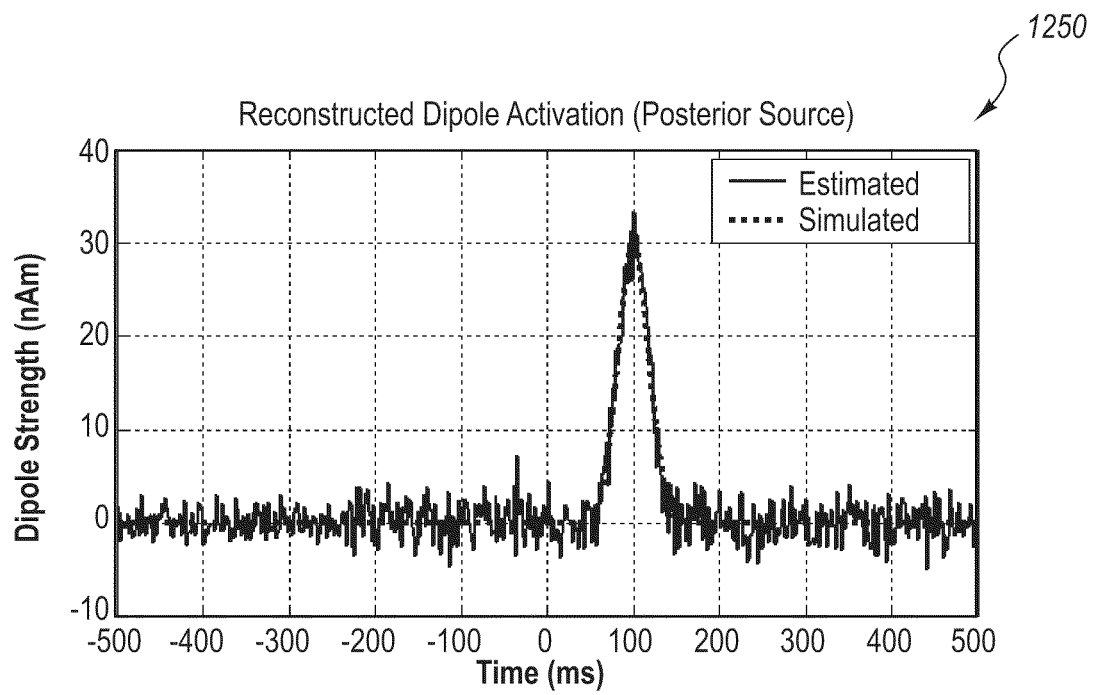

Similarly, FIG. 12A illustrates the results obtained using SAFFIRE with 4 time samples combined via incoherent integration on a 3-dimensional model 1200, wherein the sources 1210a and 1210b shown have estimated strengths greater than 1% of the maximum strength. Again, the resulting reconstructed source locations 1215a and 1215b illustrate the super-resolution that can be achieved by the algorithm, and in the absence of any localization bias. As with the previous example, the graphs 1240 and 1250 shown in FIGS. 12B and 12C, respectively, illustrate the reconstructed time-courses of activity for each of the two sources, obtained using SAFFIRE with 4 time samples, indicating a very good match between the simulated and the reconstructed curves.

Figure 13A:
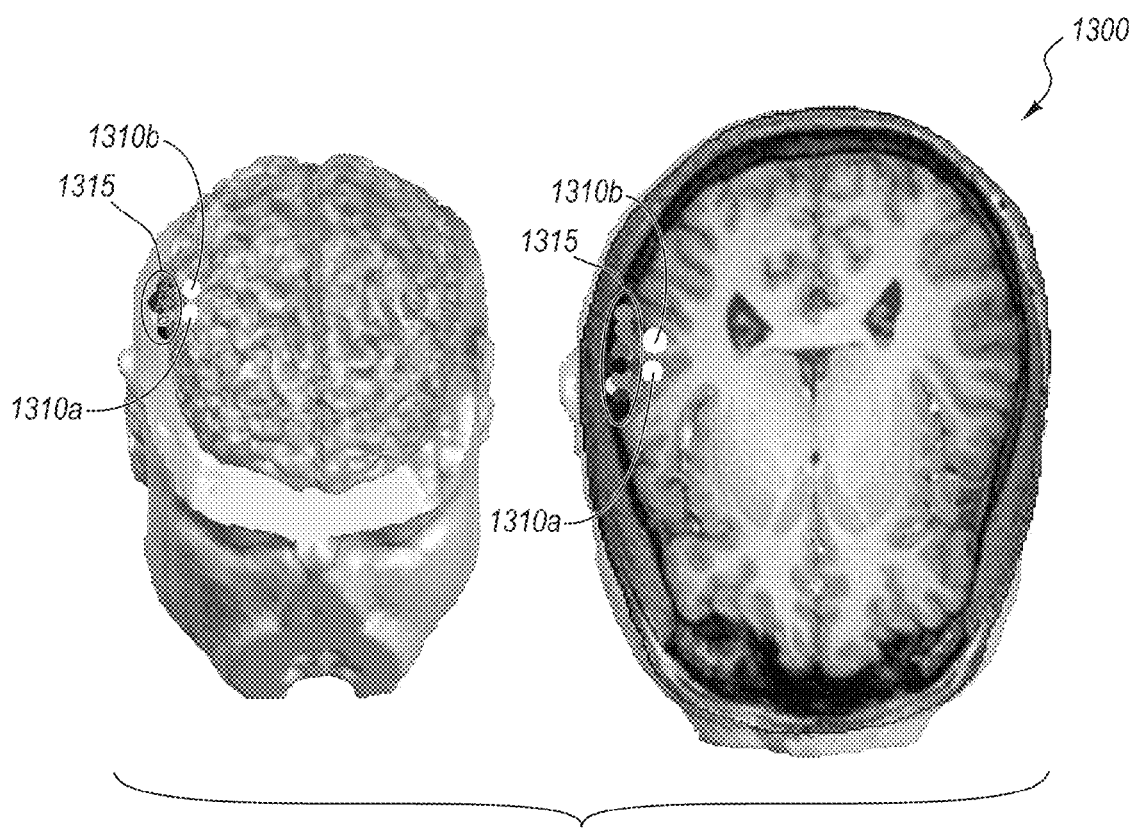
FIGS. 13A-13D illustrate the results the localization of the dipolar sources of FIGS. 10A-10C using two different MNE methods currently known in the art.
Figure 13B:
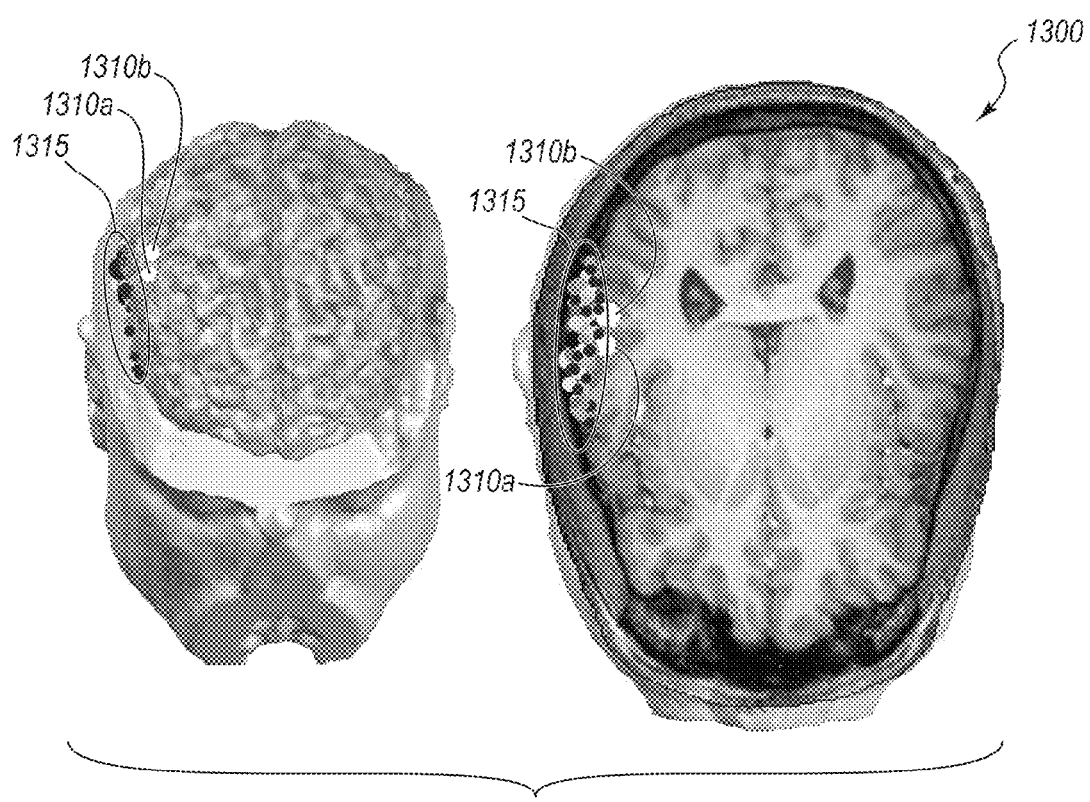
Figure 13C:
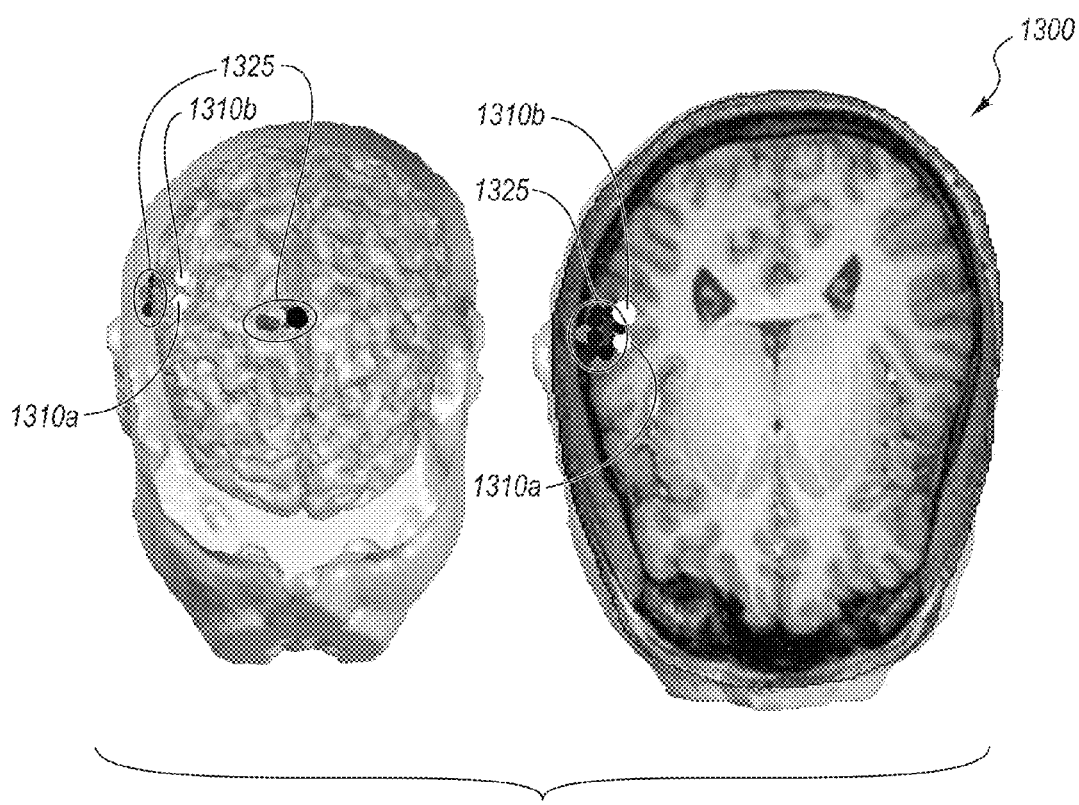
Figure 13D:
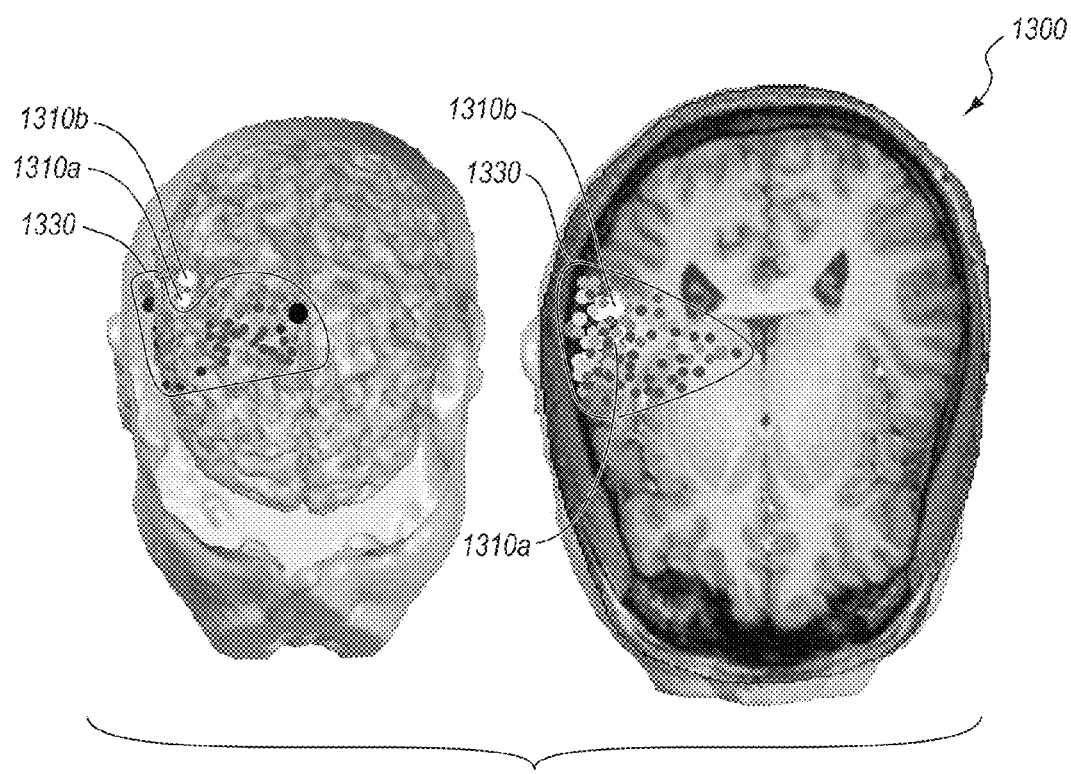

By way of comparison, FIGS. 13A-13D illustrate the results retrieved by the two different MNE algorithms known in the art on a 3-dimensional model 1300, with the algorithms applied as previously explained. FIGS. 13A and 13B illustrate the results of a regularized MNE method, where the estimated sources are clipped at 50% and 20% of the maximum results, respectively, and FIGS. 13C and 13D illustrate the results of a regularized MNE method with normalized leadfields, where the estimated sources are also clipped at 50% and 20%, respectively. Thus, in FIG. 13A, the localization results obtained using a regularized MNE with sources 1310a and 1310b having strength greater than 50% of the maximum resulted in retrieved sources at positions 1315, while in FIG. 13B, the localization results obtained using a regularized MNE with sources having strength greater than 20% of the maximum resulted in retrieved sources at positions 1320. In comparison, as shown in FIG. 8C, the localization results obtained using a regularized nMNE with sources 1310a and 1310b having strength greater than 50% of the maximum resulted in retrieved sources at positions 1325, and as shown in FIG. 13D, the localization results obtained using a regularized nMNE with sources having strength greater than 20% of the maximum resulted in retrieved sources at positions 1330. Again, these results indicate the bias of the MNE towards more superficial sources, as well as its over-smoothing effect, which prevents the discrimination of the two separate generators of magnetic field. The nMNE slightly improves the localization accuracy, but at the expense of introducing an additional incorrect deep source estimate in the region near the center of the volume conductor.

Figure 14A:
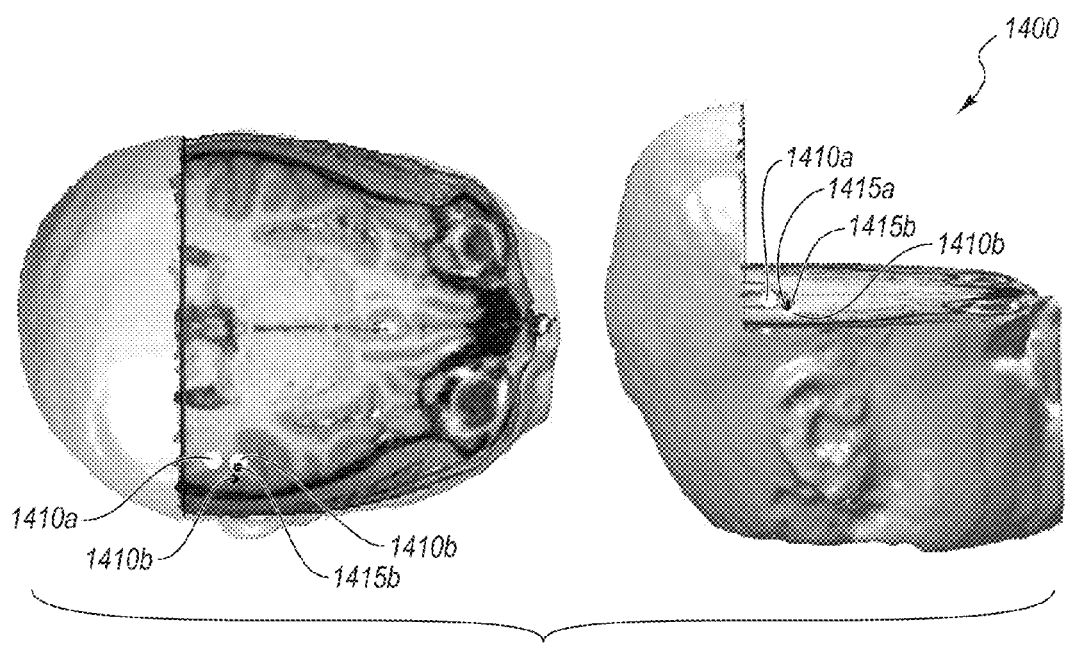
FIGS. 14A-14B illustrate the results of the localization of the dipolar sources of FIGS. 10A-10C using the FOCUSS method currently known in the art.
Figure 14B:
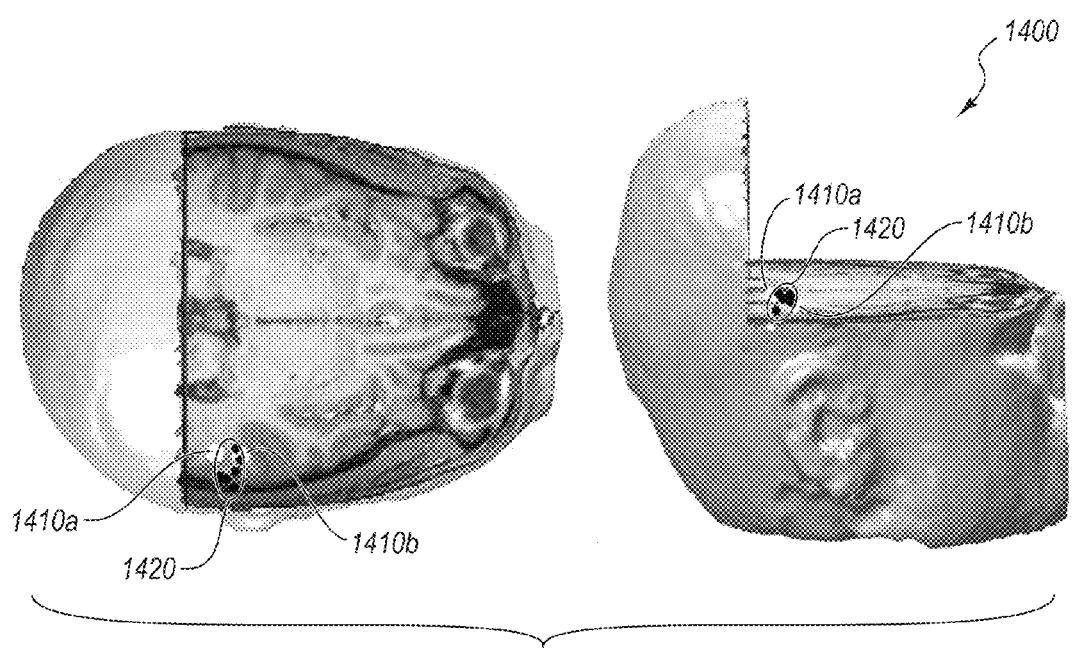

By way of comparison, FIGS. 14A and 14B illustrate the results obtained by using the FOCUSS algorithm on a 3-dimensional model 1400, with sources 1410a and 1410b having estimated strength greater than 50% and 20% of the maximum, respectively. FOCUSS has been applied as explained before (i.e. in its compound version, and a truncated SVD scheme). As shown in FIG. 14A, the localization results obtained using FOCUSS algorithm with sources having strength greater than 50% of the maximum resulted in retrieved sources at positions 1415a and 1415b, and as shown in FIG. 14B, the localization results obtained using the FOCUSS algorithm with sources having strength greater than 20% of the maximum resulted in retrieved sources at positions 1420. Thus, even though FOCUSS provides more focal solutions than the previously described MNE algorithms, it can not resolve the two simulated dipoles, thus being unable to achieve the same degree of performance when compared to SAFFIRE.

Thus, the present invention provides a method of achieving unprecedented accuracy in medical imaging, including magnetoencephalography (MEG) and electroencephalography (EEG) imaging. The invention, denoted as the Source AFFine Image REconstruction (SAFFIRE) algorithm, is based on an iterative implementation of minimum mean-square error (MMSE) estimation within an affine-transformed solution space and utilizes a matched filter bank initialization coupled with energy normalization of each successive estimate. The method of the invention has been applied to simulated brain MEG auditory response data and has demonstrated the capability to precisely isolate the generators within primary and secondary auditory cortex, a challenging problem in the MEG/EEG imaging community.

The embodiments described herein may include the use of a special purpose or general-purpose computer including various computer hardware or software modules, as discussed in greater detail below that are configured or capable of performing medical imaging as described herein. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Embodiments of the invention are described with reference to steps, acts, methods, or processes that may be performed by one or more computing systems. If implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory of the computing system.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of performing medical imaging, the method comprising:

monitoring electric activity occurring in a sampled area of a patient in response to stimuli to produce a data signal;
sampling the data signal to produce time samples;
transferring the time samples to a processing unit;
creating a data vector for each time sample of the captured signal;
creating a noise covariance matrix estimate from a plurality of the time samples, the noise covariance matrix estimate comprising only noise and ambient, non-induced signals;
creating an affine-transformed matched filter bank estimate from the noise covariance matrix estimate;
calculating the energy of the data signal at a given time sample;
energy normalizing the affine-transformed matched filter bank estimate using the calculated energy of the data signal;
performing a series of iterations comprising applying a minimum mean-square error filter bank and an energy normalization process to the affine-transformed matched filter bank estimate in order to generate a new affine-transformed matched filter bank estimate which indicates a location of the electric activity in the sampled area; and
displaying an estimate of the location of the electric activity in the sample area in a display based on the new affine-transformed matched filter bank estimate.

2. The method of claim 1, wherein the electric activity is captured using a magnetoencephalography (MEG) or electroencephalography (EEG) system.

3. The method of claim 1, wherein the sampled area comprises a patient's brain and the electric activity in the sampled area comprises neuronal activities of the patient's brain.

4. The method of claim 3, wherein monitoring the electric activity occurring in a sampled area of the patient's brain further comprises placing a plurality of electrodes on the scalp of the patient's head according to a predetermined spatial arrangement.

5. The method of claim 1, wherein applying the minimum mean-square error filter bank on the affine-transformed matched filter bank estimate comprises using an incoherent integration technique on a plurality of filter bank estimates for a plurality of time samples.

6. The method of claim 1, wherein creating an affine-transformed matched filter bank estimate comprises using temporal integration on the noise covariance matrix estimate and energy normalizing the matched filter estimate using the calculated energy of the data signal for a plurality of time samples to obtain a single affine-transformed matched filter estimate for the plurality of time samples.

7. The method of claim 1, wherein creating a data vector for each time sample of the captured signal comprises creating a data vector for each spatial region in the sampled area where electric activity is determined to be present during the time sample.

8. A system for performing medical imaging, the system comprising:

a plurality of sensing devices capable of monitoring the electric activity occurring in a sampled area of a patient in response to stimuli in order to produce a data signal and sampling the data signal to produce time samples;
a processing unit that generates a new affine-transformed matched filter bank estimate by:
creating a data vector for each time sample of the captured signal;

creating a noise covariance matrix estimate from a plurality of the time samples, the noise covariance matrix estimate comprising only noise and ambient, non-induced signals;

creating an affine-transformed matched filter bank estimate from the noise covariance matrix estimate;

determining the energy of the data signal at a given time sample;

energy normalizing the affine-transformed matched filter bank estimate using the calculated energy of the data signal; and performing a series of iterations comprising applying a minimum mean-square error filter bank and an energy normalization process to the affine-transformed matched filter bank estimate in order to generate the new affine-transformed matched filter bank estimate which indicates a location of the electric activity in the sampled area;

a plurality of leads capable of transmitting the sampled data signal from the plurality of sensing devices to the processing unit; and a display capable of displaying the estimate of the location of the electric activity in the sample area based on the new affine-transformed matched filter bank estimate.

9. The system of claim 8, wherein the plurality of sensing devices comprise a magnetoencephalography (MEG) or electroencephalography (EEG) system.

10. The system of claim 8, wherein the sampled area comprises a patient's brain and the electric activity in the sampled area comprises the neuronal activities of the patient's brain.

11. The system of claim 10, wherein the plurality of electrodes are placed on the scalp of the patient's head according to a predetermined spatial arrangement.

12. The system of claim 10, wherein applying the minimum mean-square error filter bank on the affine-transformed matched filter bank estimate comprises using an incoherent integration technique on a plurality of filter bank estimates for a plurality of time samples.

13. The system of claim 8, wherein the processing unit creates an affine-transformed matched filter bank estimate comprises using temporal integration on the noise covariance matrix estimate and energy normalizing the matched filter estimate using the calculated energy of the data signal for a plurality of time samples to obtain a single affine-transformed matched filter estimate for the plurality of time samples.

14. The system of claim 8, wherein the processing unit creates a data vector for each time sample of the captured signal by creating a data vector for each spatial region in the sampled area where electric activity is determined to be present during the time sample.

15. A method of performing medical imaging, the method comprising:

monitoring electric activity occurring in a sampled area of a patient in response to stimuli to produce a data signal;

sampling the data signal to produce time samples;

transferring the time samples to a processing unit;

creating a data vector for each time sample of the captured signal;

creating a noise covariance matrix estimate from a plurality of the time samples, the noise covariance matrix estimate comprising only noise and ambient, non-induced signals;

calculating the energy of the data signal at a given time sample;

creating an affine-transformed matched filter bank estimate from the noise covariance matrix estimate using temporal integration on the noise covariance matrix estimate and energy normalizing the matched filter estimate using the calculated energy of the data signal for a plurality of time samples to obtain a single affine-transformed matched filter estimate for the plurality of time samples;

energy normalizing the affine-transformed matched filter bank estimate using the calculated energy of the data signal;

performing a series of iterations comprising applying a minimum mean-square error filter bank and an energy normalization process to the affine-transformed matched filter bank estimate using an incoherent integration technique on a plurality of filter bank estimates for a plurality of time samples in order to generate a new affine-transformed matched filter bank estimate which indicates a location of the electric activity in the sampled area during the plurality of time samples; and displaying an estimate of the location of the electric activity in the sample area in a display based on the new affine-transformed matched filter bank estimate.

16. The method of claim 15, wherein the electric activity is captured using a magnetoencephalography (MEG) or electroencephalography (EEG) system.

17. The method of claim 15, wherein the sampled area comprises a patient's brain and the electric activity in the sampled area comprises neuronal activities of the patient's brain.

18. The method of claim 17, wherein monitoring the electric activity occurring in a sampled area of the patient's brain further comprises placing a plurality of electrodes on the scalp of the patient's head according to a predetermined spatial arrangement.

19. The method of claim 18, wherein the data signal is sampled at a rate between 300 Hz and 1 kHz.

20. The method of claim 15, wherein creating a data vector for each time sample of the captured signal comprises creating a data vector for each spatial region in the sampled area where electric activity is determined to be present during the time sample.

* * * * *